(12) United States Patent
Wang et al.

(10) Patent No.: US 11,295,133 B2
(45) Date of Patent: Apr. 5, 2022

(54) INTERACTION DISPLAY METHOD AND INTERACTION DISPLAY SYSTEM

(71) Applicant: Industrial Technology Research Institute, Hsinchu (TW)

(72) Inventors: Pi-Hsien Wang, Hsinchu (TW); Yu-Hsin Lin, Miaoli County (TW); Chih-Chia Chang, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 16/680,497

(22) Filed: Nov. 12, 2019

(65) Prior Publication Data
US 2021/0064875 A1 Mar. 4, 2021

(30) Foreign Application Priority Data
Aug. 28, 2019 (TW) ................. 108130804

(51) Int. Cl.
*G06K 9/00* (2006.01)
*G06K 9/46* (2006.01)
*G06F 3/0488* (2013.01)
*G06F 3/04883* (2022.01)

(52) U.S. Cl.
CPC ..... *G06K 9/00671* (2013.01); *G06F 3/04883* (2013.01); *G06K 9/4671* (2013.01); *G06K 2209/21* (2013.01)

(58) Field of Classification Search
CPC ............. G06K 9/00671; G06K 9/4671; G06K 2209/21; G06K 9/00597; G06K 9/00375; G06F 3/04883; G06F 2203/0381; G06F 3/013; G06F 3/017; G06F 3/042; G06F 3/011
See application file for complete search history.

(56) References Cited

U.S. PATENT DOCUMENTS

| 10,048,747 B2 | 8/2018 | Lee et al. |
| 2007/0273670 A1 | 11/2007 | Nordahl |
| 2011/0267265 A1* | 11/2011 | Stinson ................... G06F 3/017 345/157 |

(Continued)

FOREIGN PATENT DOCUMENTS

| CN | 107247926 | 10/2017 |
| TW | I636425 | 9/2018 |

*Primary Examiner* — Michael Le
(74) *Attorney, Agent, or Firm* — JCIPRNET

(57) ABSTRACT

An interaction display method and an interaction display system are provided. The interaction display system includes a transparent display and at least one image sensing device. Image data of a plurality of operators is captured by the image sensing device. At least one local feature and at least one global feature of the operators are extracted from the image data, and at least one projection point on a display plane of the transparent display is detected. Each local feature and each global feature are paired. Each projection point and each global feature are paired. According to a pairing result between each local feature and each global feature and a pairing result between each projection point and each global feature, a pointing direction of one of the operators is determined, an interaction continuation operation is performed, and/or notification information is provided.

18 Claims, 17 Drawing Sheets

(56) References Cited

U.S. PATENT DOCUMENTS

| | | | |
|---|---|---|---|
| 2012/0206333 A1* | 8/2012 | Kim | H04N 21/44218 |
| | | | 345/156 |
| 2012/0249416 A1 | 10/2012 | Maciocci et al. | |
| 2015/0213702 A1* | 7/2015 | Kimmel | G06T 7/20 |
| | | | 382/103 |
| 2015/0338914 A1* | 11/2015 | Andrysco | G06F 3/013 |
| | | | 345/173 |
| 2016/0170603 A1* | 6/2016 | Bastien | G06F 3/005 |
| | | | 348/49 |
| 2016/0179205 A1* | 6/2016 | Katz | G06F 3/013 |
| | | | 345/156 |
| 2017/0068414 A1 | 3/2017 | Plumb | |
| 2017/0287139 A1* | 10/2017 | Lee | G06K 9/00355 |
| 2018/0285634 A1 | 10/2018 | Varadarajan et al. | |
| 2019/0392647 A1* | 12/2019 | Lee | G02B 27/0172 |

\* cited by examiner

INTERACTION DISPLAY METHOD AND INTERACTION DISPLAY SYSTEM

CROSS-REFERENCE TO RELATED APPLICATION

This application claims the priority benefit of Taiwan application serial no. 108130804, filed on Aug. 28, 2019. The entirety of the above-mentioned patent application is hereby incorporated by reference herein.

TECHNICAL FIELD

The disclosure relates to an interaction display method and an interaction display system.

BACKGROUND

A transparent display may be including a transmissive transparent display and/or a projection transparent display. The transparent display has the characteristics of transparency, lightness, and thinness, which may combine a virtual image displayed on the display with a scene of the real world, giving the user an intuitive visual experience. The transparent display may be widely used in applications such as car head-up displays, vending machines, merchandise windows, museum exhibits, sightseeing vehicle tours, etc. Viewers not only may see a real object through the transparent display, but also may see the information superimposed on or displayed around the transparent display, and even interact, through a biometric tracking technique or a touch technique, with information displayed on the transparent display.

Although a directional interaction display method combining a display technique and a biometric tracking technique or a touch technique has gradually appeared in various applications, these techniques still need to be improved. For example, an interaction display system may combine a plurality of human features or touch points to identify user interaction intentions, thereby providing display information that meets user expectations. However, when a plurality of users interact with the interaction display system at the same time, the interaction display system may detect many human features and many touch points, but the interaction display system may not correctly pair these human features or touch points, causing the interaction display system to be prone to directivity confusion. In other words, under the condition that the human body features and touch points of the same user are correctly paired may the user's pointing direction be correctly estimated to provide display content that meets the user's expectations. For example, FIG. 1 is a schematic diagram of interaction between a transparent display 10 and a plurality of users. If the interaction display system pairs an eye feature E1 of a user A1 to a touch point T1 given by another user B1 to a display plane S1, the interaction display system generates an incorrect pointing direction V1. The interaction display system displays object information (i.e., a caterpillar) of a target object Obj1 behind the transparent display 10 according to the incorrect pointing direction V1, and may not display, according to a correct pointing direction V2, object information of a target object Obj2 that meets the user A1's expectations.

SUMMARY

An embodiment of the disclosure provides an interaction display method adapted for an interaction display system including a transparent display, at least one image sensing device, and a processing device. The interaction display method includes the following steps. An image data of a plurality of operators is captured by the image sensing device. The processing device performs the following steps. At least one local feature and at least one global feature of the operators are extracted from the image data, and at least one projection point on a display plane of the transparent display is detected, wherein the projection point is generated in response to an interactive behavior of the operators. Each of the local features and each of the global features are paired. Each of the projection points and each of the global features are paired. A pointing direction of one of the operators is determined according to a pairing result between each of the local features and each of the global features and a pairing result between each of the projection points and each of the global features.

An embodiment of the disclosure provides an interaction display system, including a transparent display, at least one image sensing device, and a processing device. The processing device is coupled to the transparent display and the image sensing device. The image sensing device captures an image data of a plurality of operators. The processing device is configured to perform the following steps. At least one local feature and at least one global feature of the operators are extracted from the image data and at least one projection point on a display plane of the transparent display is detected, wherein the projection point is generated in response to an interactive behavior of the operators. Each of the local features and each of the global features are paired. Each of the projection points and each of the global features are paired. A pointing direction of one of the operators is determined according to a pairing result between each of the local features and each of the global features and a pairing result between each of the projection points and each of the global features.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Some embodiments of the disclosure will be described in detail below with reference to the accompanying drawings. For reference symbols used in the following descriptions, the same reference symbols in different drawings represent the same or similar components. These embodiments are merely a part of the disclosure, and do not disclose all possible implementations of the disclosure. More specifically, these embodiments are merely examples of a method, a system, and an apparatus in the claims of the disclosure.

In an embodiment of the disclosure, when a plurality of operators interact with a transparent display, a plurality of interaction intention information (such as a local organ feature, a limb feature, a touch point, or a floating pointing projection point) belonging to a same operator are correctly paired to determine a correct pointing direction based on the plurality of interaction intention information corresponding to the same operator. Therefore, a transparent display may display, according to a correct pointing direction, display content that meets the operator's intention. In addition, when operator's feature information fails to be detected or the interaction intention information may not be successfully paired, the operator's notification information (for example, suggestion for a moving location, notification of a missing feature, and notification of an identifiable or an unidentifiable operator identification code (User ID), etc.) may be provided to improve a success rate and accuracy of feature detection and pairing of a plurality of interaction intention information. Moreover, when the characteristics of the operator may not be correctly sensed or the interaction intention information may not be successfully paired, a pointing direction may also be determined according to the remaining available interaction intention information, so as to continue the interaction for use.

Figure 1:
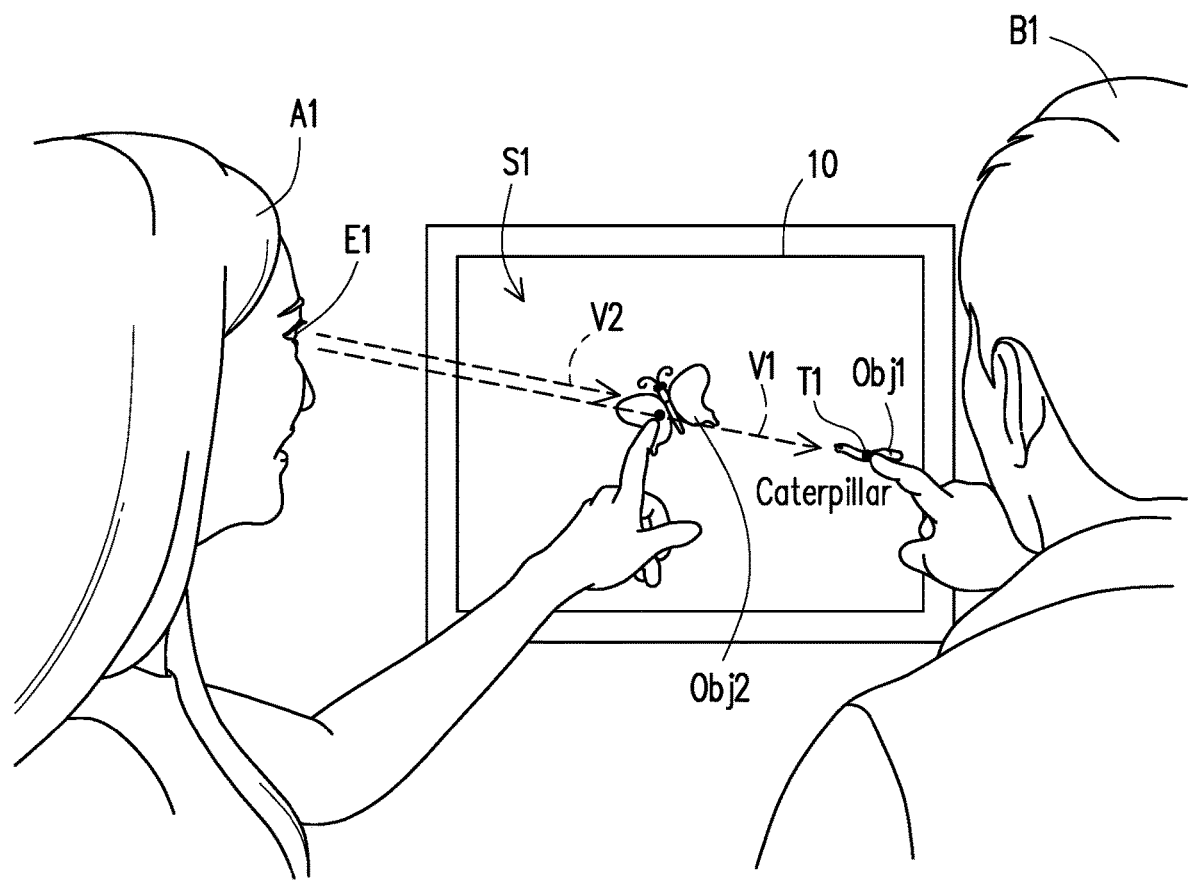
FIG. 1 is a schematic diagram of interaction between a conventional transparent display and a plurality of users.
Figure 2:
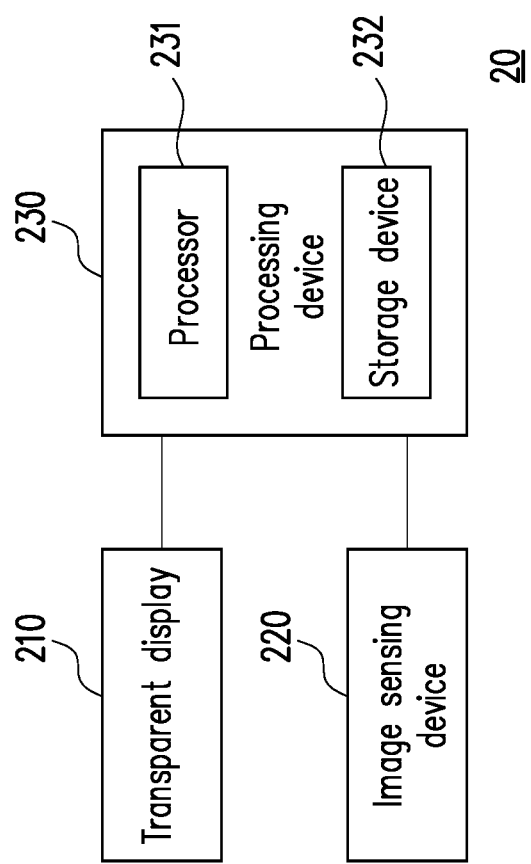
FIG. 2 is a schematic diagram of an interaction display system according to an embodiment of the disclosure.

FIG. 2 is a schematic diagram of an interaction display system according to an embodiment of the disclosure. Referring to FIG. 2, an interaction display system 20 includes a transparent display 210, at least one image sensing device 220, and a processing device 230. The processing device 230 may be coupled to the transparent display 210 and the image sensing device 220. The interaction display system 20 may interact with a plurality of operators. Furthermore, the interaction display system 20 may determine pointing directions of the plurality of operators, and provide corresponding display effects and content accordingly. In the present embodiment of the disclosure, the operators may be robots, robotic arms, machine tools, or human users, which is not limited in the disclosure.

The transparent display 210 is a display or a floating projection device having a certain degree of light transmittance, for example, a thin film transistor liquid crystal display (TFT-LCD), a field sequential color display, an active matrix organic light emitting display (AMOLED), a transmission transparent display such as an electrowetting display, or a transparent projection display, which may present a view of the display relative to the other side of the user when being viewed by a human user. In an embodiment, in addition to a transparent display panel capable of displaying information that is included, the transparent display 210 may also be combined with the touch panel to receive interaction of the user from direct contact, or be combined with a sensor that may detect a click and gesture trigger, for example, sensing a hand trigger action through a sound wave, an infrared light, or an image to provide an interaction display function based on the trigger action.

The image sensing device 220 may capture an image data of a plurality of operators located on one side of the transparent display 210. In an embodiment, to capture the image data of the plurality of operators, the image sensing device 220 may be configured as a plurality of sets of image sensing devices to expand the field of view of the photographic features and combine a plurality of sets of detection images. The image sensing device 220 may capture the image data of the plurality of operators according to an infrared light sensing technique, a natural light sensing technique, an ultrasonic sensing technique, a laser sensing technique, or the like, which is not limited in the disclosure. From another point of view, the image sensing device 220 may be an image sensing device such as an eye tracker, a depth camera, a color camera, a stereo camera, or the like. In addition, FIG. 2 is an example of an image sensing device 220 for description. In other embodiments, there may be one or more image sensing devices, which is not limited in the disclosure.

The processing device 230 includes one or more processors (a processor 231 as an example for description below) and one or more storage devices (a storage device 232 as an example for description below). The processing device 230 may be implemented by a computer host, a server, or a computer device with data computing capabilities. In addition, the processing device 230 may be implemented by one or more electronic devices, which is not limited in the disclosure.

The processor 231 is, for example, a central processing unit (CPU) or other programmable general-purpose or special-purpose microprocessors, a digital signal processor (DSP), a programmable controller, an application-specific integrated circuit (ASIC), a programmable logic device (PLD), or other similar devices, or a combination of these devices. The processor 231 is configured to execute a command or a program recorded by the storage device 232. In the disclosure, the processor 231 is configured to perform an operation on operator feature extraction, pairing between local features and global features, and pairing between projection points and global features. The processor 231 may determine pointing direction information of the operator according to the pairing result, and determine the display content according to the pointing direction information. If an operator's local features, global features, or projection points are missing, the processor 231 is configured to perform an interaction continuation operation to generate continuous pointing direction information, and may be configured to provide notification information to the user.

The storage device 232 may be any type of fixed or removable random-access memory (RAM), a read-only memory (ROM), a flash memory, or a similar element, or a combination of the foregoing elements. The storage device 232 is configured to store an image data captured by the image sensing device 220 and record programs or commands that are accessible and executable by the processor 231. In the disclosure, the storage device 232 may be configured to store image extraction feature information and operator feature database for operation query.

Figure 3A:
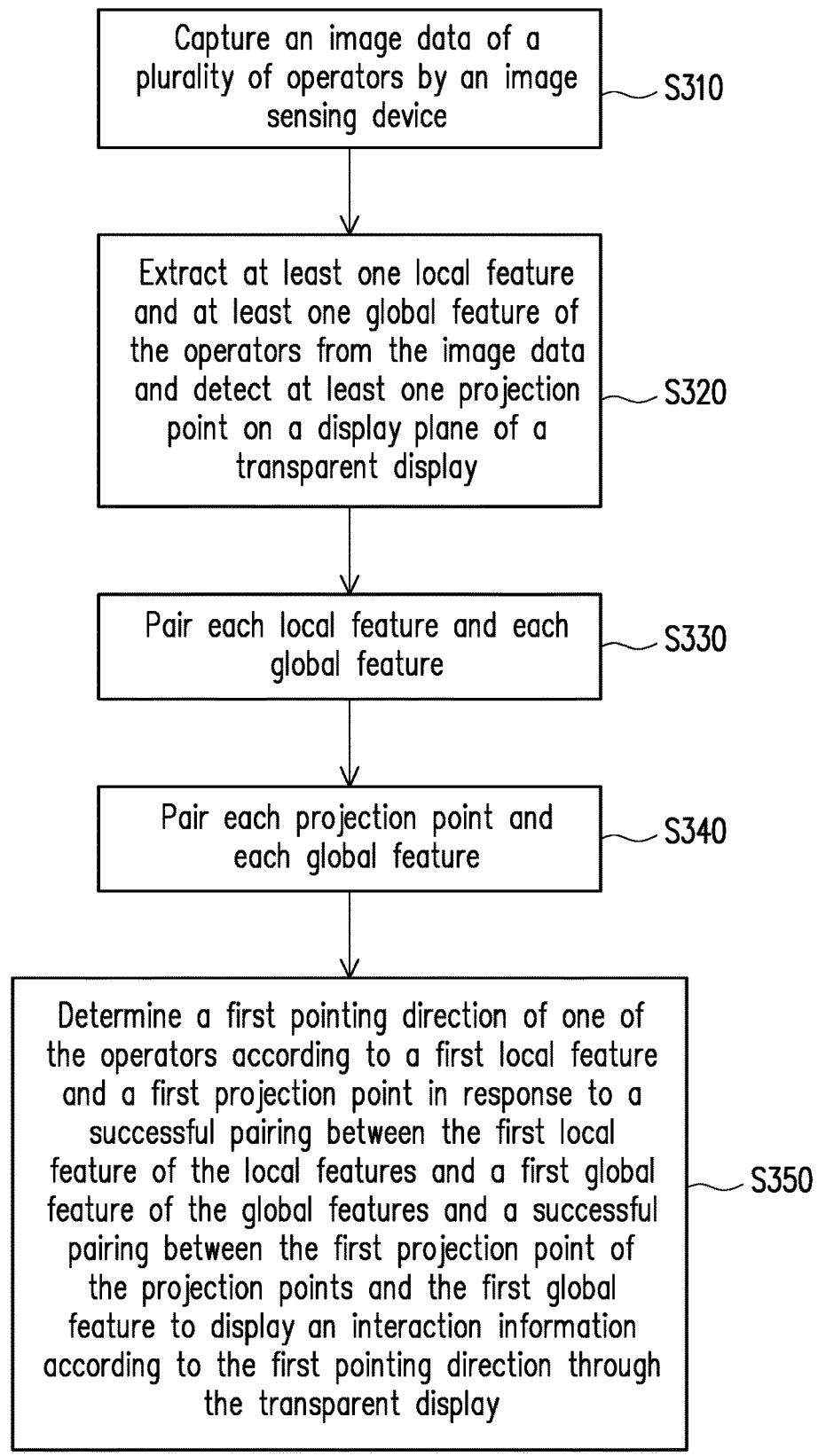
FIG. 3A is a flowchart of an interaction display method according to an embodiment of the disclosure.

FIG. 3A is a flowchart of an interaction display method according to an embodiment of the disclosure. The method process in FIG. 3A may be implemented in combination with the interaction display system 20 shown in FIG. 2. Refer to FIG. 2 and FIG. 3A together.

First, an image sensing device 220 captures an image data of a plurality of operators (Step S310). The image data may include color images, depth images, infrared sensing images, ultrasound images, or laser images, etc. In addition, the image data may include a plurality of images with different image capturing ranges. For example, the image data may include a local image data for capturing a local part of the operator, such as a facial image, a hand image, or a local image data captured for a handheld object. The foregoing handheld device is, for example, a remote-control object or a remote-control electronic device for interacting with the transparent display 210. Moreover, the image data may further include a global image data for capturing the operator's overall image, such as a global image data covering part of the body or a whole body of the operator.

After the image data of the plurality of operators is obtained, the processing device 230 extracts at least one local feature and at least one global feature of the operators from the image data, and detects at least one projection point on a display plane of the transparent display 210 (step S320). The processing device 230 may extract at least one local feature and at least one global feature of the operators from the image data. The local features are features with operator interaction intentions, for example, eye features, line of sight features, part features of a robot, or totem features on a handheld object, etc. The global features are features that may indicate features of the operator's manipulation gestures, for example, limb features, skeleton features, gesture features, and the like.

In addition, the projection points on the display plane are generated in response to an interactive behaviour of the operators, and the interactive behaviour of the operators includes a touch behaviour of actually touching the display plane or a floating pointing behaviour of not actually touching the display plane. In other words, the projection points on the display plane are, for example, touch points detected by the transparent display 210, or may be floating pointing projection points estimated based on an image analysis technique, a biometric feature sensing technique, or a somatosensory detection technique.

Next, the processing device 230 pairs each of the local features and each of the global features (step S330). Further, the processing device 230 pairs each of the projection points and each of the global features (step S340). Step S330 and step S340 may also be alternately performed, between which there is no sequential relationship. In other words, the processing device 230 determines whether the local features may be paired with the global features one by one to obtain a paired connection relationship between the local features and the global features. Similarly, the processing device 230 determines whether the projection points may be paired with the global features one by one to obtain a paired connection relationship between the projection points and the global features.

When the local features and the global features are extracted, the processing device 230 may obtain both a planar coordinate location of the local features relative to an image coordinate system and a planar coordinate location of the global features relative to the image coordinate system. In addition, when the projection points are detected, the processing device 230 may simultaneously obtain a plane coordinate location of the projection points relative to a screen coordinate system. The processing device 230 may perform coordinate system transformation fusion to obtain local features, global features, and a spatial coordinate location of the projection points relative to a same reference coordinate system. On this basis, the processing device 230 may pair each of the local features and each of the global features according to the spatial coordinate location of the local features relative to the reference coordinate system and the spatial coordinate location of the global features relative to the reference coordinate system. The processing device 230 may pair each of the projection points and each of the global features according to the spatial coordinate location of the projection points relative to the reference coordinate system and the spatial coordinate location of the global features relative to the reference coordinate system.

For example, the local features as the eye features and the global features as the limb features are used herein as examples. For a same operator, because the eyes are located on the head, there is an association between a spatial coordinate location of the eye features and a spatial coordinate location of the head features in the limb features. According to the spatial coordinate location of the eye features and the spatial coordinate location of the head features in the limb features, the processing device 230 may pair the eye features as the local features with the limb features as the global features, thereby pairing the local features with the global features that belong to the same operator. The processing device 230 may determine whether a distance between the spatial coordinate location of the local features and the spatial coordinate location of the global features is within a threshold range of the global features corresponding to the local features in a feature database to determine whether to pair the local features and the global features. For example, a range of the head features (that is, global features) extracted from the image is converted to a common space with a projection size of 10-15 cm. Although varying from person to person, the location of the eye features (that is, local features) is also within the head range. An area within ±8 cm of the center point of the head features may be set as an eye pairing area accordingly.

In addition, the projection points as the touch points and the global features as the limb features are used herein as examples. For the same operator, the touch points are generated because the hand touches the display plane, and therefore, there is an association between the spatial coordinate location of the projection points and the spatial coordinate location of the hand features in the limb features. For example, the processing device 230 detects, using global images, that the operator performs a touch operation at a location of 7 cm in a lateral direction of the touch panel, and detects a total of 15 cm of the touch panel. At the same time, the touch panel detects that the operator's touch operation occurs at a touch location of 7 cm in the lateral direction of the panel, and therefore, the processing device 230 may pair the operator's global features with the touch point. As a result, according to the spatial coordinate location of the projection points and the spatial coordinate location of the hand features in the limb features, the processing device 230 may pair the touch point as the projection points with the limb features as the global features, thereby pairing the projection points with the global features that belong to the same operator. The processing device 230 may determine whether the spatial coordinate location of the touch point is close enough to the spatial coordinate location of the hand features to determine whether to pair the projection points with the global features.

Afterwards, the processing device 230 may determine a pointing direction of one of the operators according to a pairing result between each of the local features and each of the global features and a pairing result between each of the projection points and each of the global features. In the present embodiment, in response to successful pairing between a first local feature of the local features and a first global feature of the global features via location or image feature information and successful pairing between a first projection point of the projection points and the first global feature via the location or image feature information, the processing device 230 determines a first pointing direction of one of the operators according to the first local feature and the first projection point to display interaction information according to the first pointing direction through the transparent display 210 (step S350). For example, the processing device 230 may determine a target object with the first pointing direction to a rear of the transparent display 210, thereby driving the transparent display 210 to display object information of the target object. In an embodiment of the disclosure, the first local feature is successfully paired to the first global feature, indicating that the first local feature may be in one-to-one pairing to the first global feature. The first projection point is successfully paired to the first global feature, indicating that the first projection point may be in one-to-one pairing to the first global feature. It should be noted that because there are associations between the global features and the local features and the projection points, the local features and the projection points may be successively paired to the global features. Then, the local features and projection points successfully paired to the same global feature may be determined to correspond to the same operator, and a correct pointing direction is generated according to the local features and projection points belonging to the same operator, thereby avoiding an incorrect pointing direction caused by an interaction intention information pairing error.

Figure 3B:
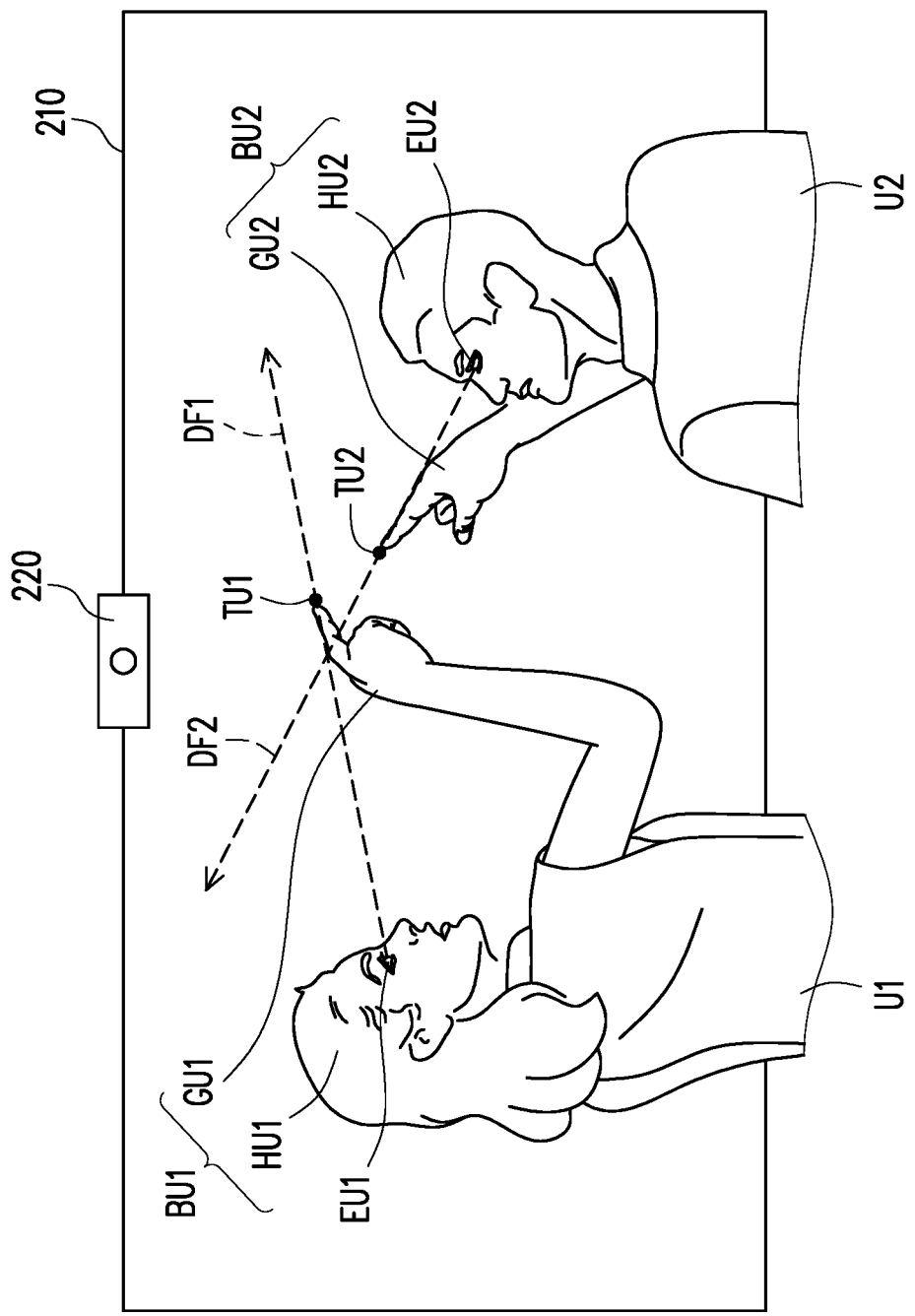
FIG. 3B is a schematic diagram of a scenario in which a transparent display interacts with a plurality of users according to an embodiment of the disclosure.

For example, refer to FIG. 3B. FIG. 3B is a schematic diagram of a scenario according to an embodiment of the disclosure. After the image sensing device 220 captures an image data of a user U1 and a user U2, a processing device 230 may obtain eye features EU1 and EU2 and limb features BU1 and BU2 from the image data. The processing device 230 may obtain a touch point TU1 and a touch point TU2 according to touch detection by the transparent display 210. Next, the processing device 230 may pair the eye feature EU1 and the limb feature BU1 according to a spatial coordinate location of the eye feature EU1 and a spatial coordinate location of a head feature HU1 in the limb feature BU1. Moreover, the processing device 230 may pair the touch point TU1 and the limb feature BU1 according to a spatial coordinate location of the touch point TU1 and a spatial coordinate location of a hand feature GU1 in the limb feature BU1. Therefore, the processing device 230 may obtain correspondence between the eye feature EU1 and the touch point TU1, thereby generating a pointing direction DF1 of the user U1 according to the eye feature EU1 and the touch point TU1. The transparent display 210 may display, according to the pointing direction DF1, interaction information in conformity with the interaction intention. It may be seen that the processing device 230 may avoid incorrect pointing information as a result of pairing the eye features belonging to different users with the touch points. Similarly, the processing device 230 may obtain the correspondence between the eye feature EU2 and the touch point TU2 using the hand feature GU2 and the head feature HU2 in the limb feature BU2, thereby generating a pointing direction DF2 of the user U2 according to the eye feature EU2 and the touch point TU2. On this basis, the transparent display 210 displays interaction information to the users U1 and U2 based on the pointing directions DF1 and DF2.

In an embodiment, the processing device 230 may further determine whether the first pointing direction passes through a display plane of the transparent display 210 to determine whether to display the interaction information according to the first pointing direction. In other words, when the first pointing direction passes through the display range of the transparent display 210, the processing device 230 may provide interaction information to the operators. Otherwise, when the first pointing direction does not pass through the display range of the transparent display 210, the processing device 230 does not provide interaction information to the operators.

Figure 4:
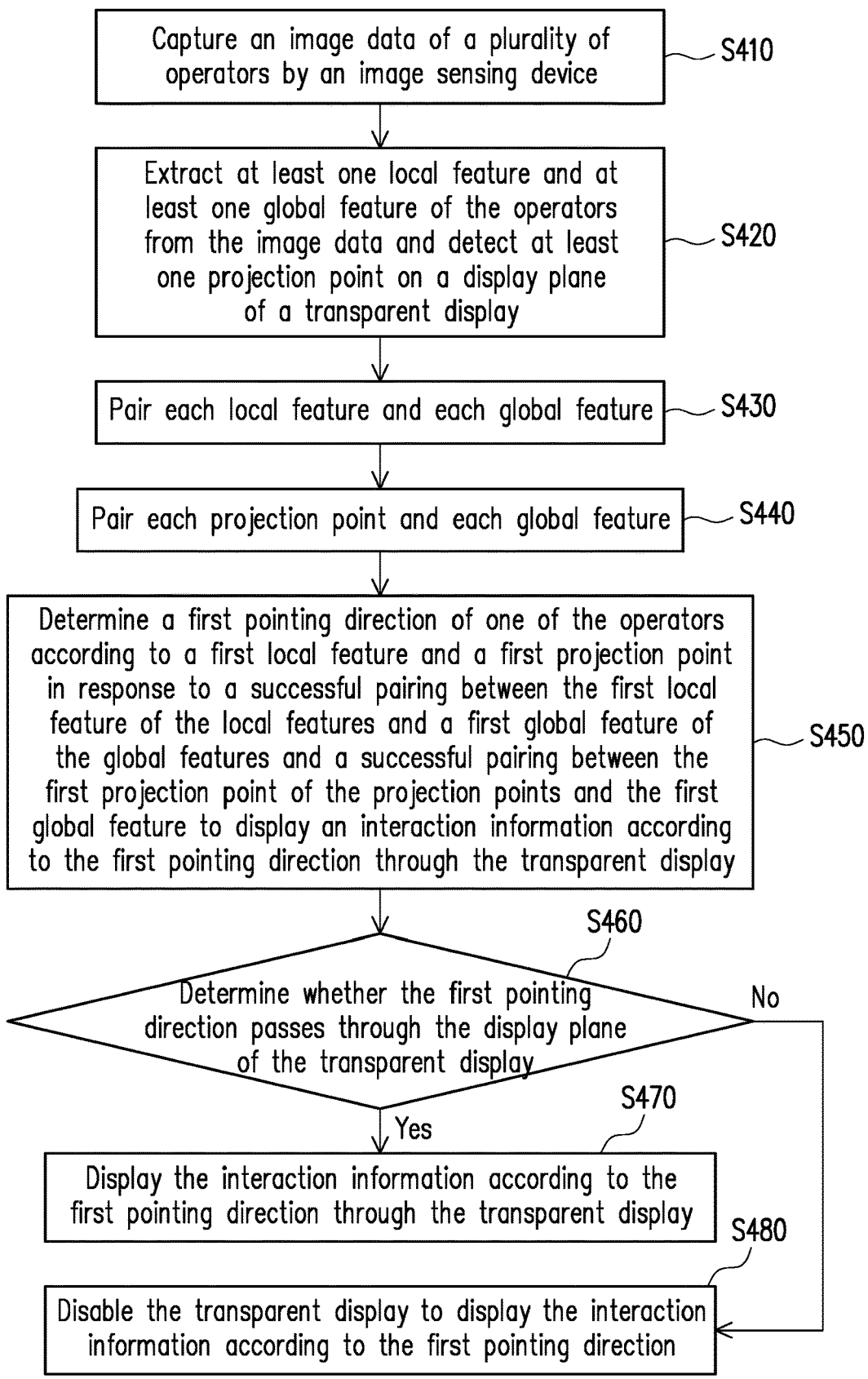
FIG. 4 is a flowchart of an interaction display method according to an embodiment of the disclosure.

FIG. 4 is a flowchart of an interaction display method according to an embodiment of the disclosure. The method process in FIG. 4 may be implemented in combination with the interaction display system 20 shown in FIG. 2. Refer to FIG. 2 and FIG. 4 together. Steps S410 to S450 are similar to steps S310 to S350 of the foregoing embodiment, so the descriptions thereof are omitted herein.

In the present embodiment, the processing device 230 determines whether the first pointing direction passes through a display plane of the transparent display 210 (step S460). The first pointing direction is vector information, and therefore the processing device 230 may determine whether the first pointing direction passes through a plane (that is, a display plane) with a specific size in space. If the first pointing direction passes through the display plane of the transparent display 210, the processing device 230 displays the interaction information according to the first pointing direction through the transparent display 210 (step S470). As shown in FIG. 2B, the processing device 230 may determine that the first pointing direction DF1 passes through a display plane S2 of the transparent display 210, and displays the interaction information according to the first pointing direction DF1 through the transparent display 210. According to another aspect, if the first pointing direction does not pass through the display plane of the transparent display 210, the processing device 230 disables the transparent display 210 to display the interaction information according to the first pointing direction (step S480).

In an embodiment, when the local features may not be in one-to-one pairing with the global features successfully, or the global features may not be in one-to-one pairing with the projection points successfully, the processing device 230 may generate notification information for the operators, for example, suggestion for a moving location, notification of a missing feature, an identifiable or an unidentifiable user ID, etc., and the transparent display 210 displays the notification information. Therefore, if the operators may correctly correct the location according to the notification information, the processing device 230 may obtain the local features, global features, or projection points that were originally missing in the past, thereby improving the pairing success rate of the local features, the global features, and the projection points. In addition, when the local features, the global features, and the projection points may not be successfully paired or are missing, the processing device 230 may determine an appropriate pointing direction according to available local features that are unsuccessfully paired, global features, or projection points, so that the operators continue to interact with the interaction display system 20.

Figure 5:
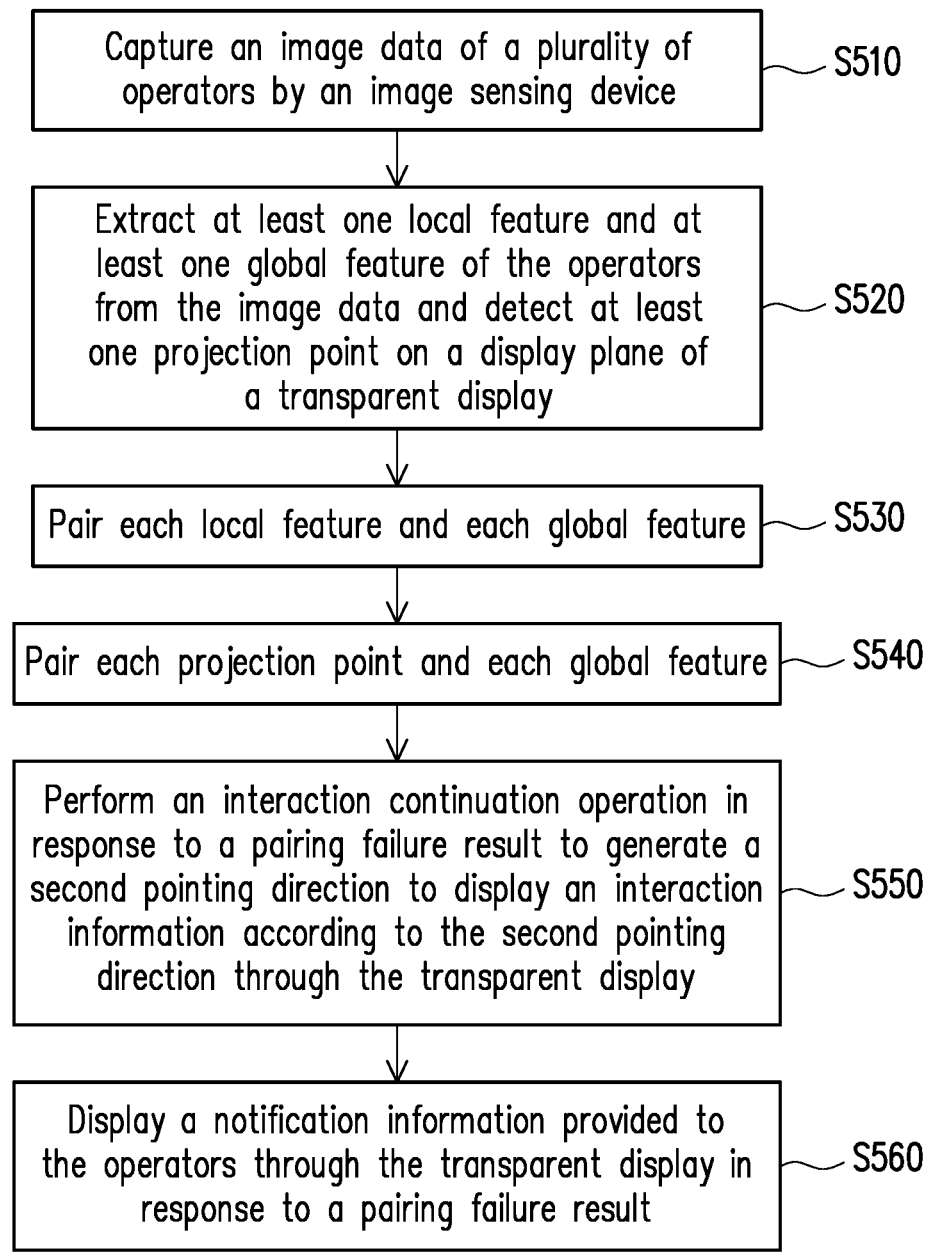
FIG. 5 is a flowchart of an interaction display method according to an embodiment of the disclosure.

FIG. 5 is a flowchart of an interaction display method according to an embodiment of the disclosure. The method process in FIG. 5 may be implemented in combination with the interaction display system 20 shown in FIG. 2. Refer to FIG. 2 and FIG. 5 together. Steps S510 to S540 are similar to steps S310 to S340 of the foregoing embodiment, so the descriptions thereof are omitted herein.

In the present embodiment, in response to a pairing failure result, the processing device 230 performs an interaction continuation operation to generate a second pointing direction to display interaction information according to the second pointing direction through the transparent display 210 (step S550). The pairing failure result includes: an unsuccessful pairing of a second local feature of the local features, an unsuccessful pairing of a second projection point of the projection points, or an unsuccessful pairing of a second global feature of the global features. To this end, the local features, the global features, and the projection points that may not be in successful one-to-one pairing are respectively referred to as second local features, second global features, and second projection points, and a pointing direction that is completed using any unsuccessful paired feature is referred to as a second pointing direction. The interaction continuation operation includes: the processing device 230 determines, according to the unsuccessfully paired second local feature, the unsuccessfully paired second global feature, or the unsuccessfully paired second projection point, the second pointing direction of one of the operators to display the interaction information according to the second pointing direction through the transparent display 210.

Errors may occur during the feature extraction or during the detection of the projection points, resulting in loss of local features, global features, or projection points of some operators. Alternatively, erroneous determination may occur during the pairing between the local features and global features. Alternatively, erroneous determination may occur during the pairing between the projection points and global features. Alternatively, overlapped pairing of the plurality of operators may occur during the pairing between the local features and global features. Alternatively, pairing of the plurality of operators may be overlapped during the pairing between the projection points and global features. Alternatively, if the operator's body part exceeds the image sensing range, the loss of local features or global features of some operators may occur. The above phenomena may result in unsuccessful one-to-one pairing of the local features to the global features, or may cause unsuccessful one-to-one pairing of the projection points to the global features. In the present embodiment, in response to a pairing failure result, the processing device 230 may determine, based on the unsuccessfully paired second local feature, the unsuccessfully paired second global feature, or the unsuccessfully paired second projection point, the second pointing direction for continuing an interaction experience. Subsequent embodiments are to be described in detail for different implementations of the interaction continuation operation. In addition, based on the description of FIG. 4, the processing device 230 may also determine whether the second pointing direction passes through the display plane to determine whether to display interaction information.

Moreover, in response to a pairing failure result, the processing device 230 displays notification information to the operator through the transparent display 210, for example, suggesting a moving location, notifying a missing feature, notifying an identifiable or an unidentifiable user ID, etc., and the transparent display 210 displays the notification information (step S560). In other words, the processing device 230 may generate notification information according to the pairing result between step S530 and step S540. For example, assuming that an operator's local features are missing, one of the global features may not be paired to the current extracted local feature. In this case, the processing device 230 may notify the operator of a moving location or a moving direction. If the operator moves according to the moving location or the moving direction, a condition that the local features are missing may be excluded, and the processing device 230 may successfully pair the local features and the global features of the moved operator.

The following embodiments are used as examples of a plurality of pointing calculation manners in the interaction continuation operation. That is, step S550 of FIG. 5 may include the following various different implementations.

Figure 6A:
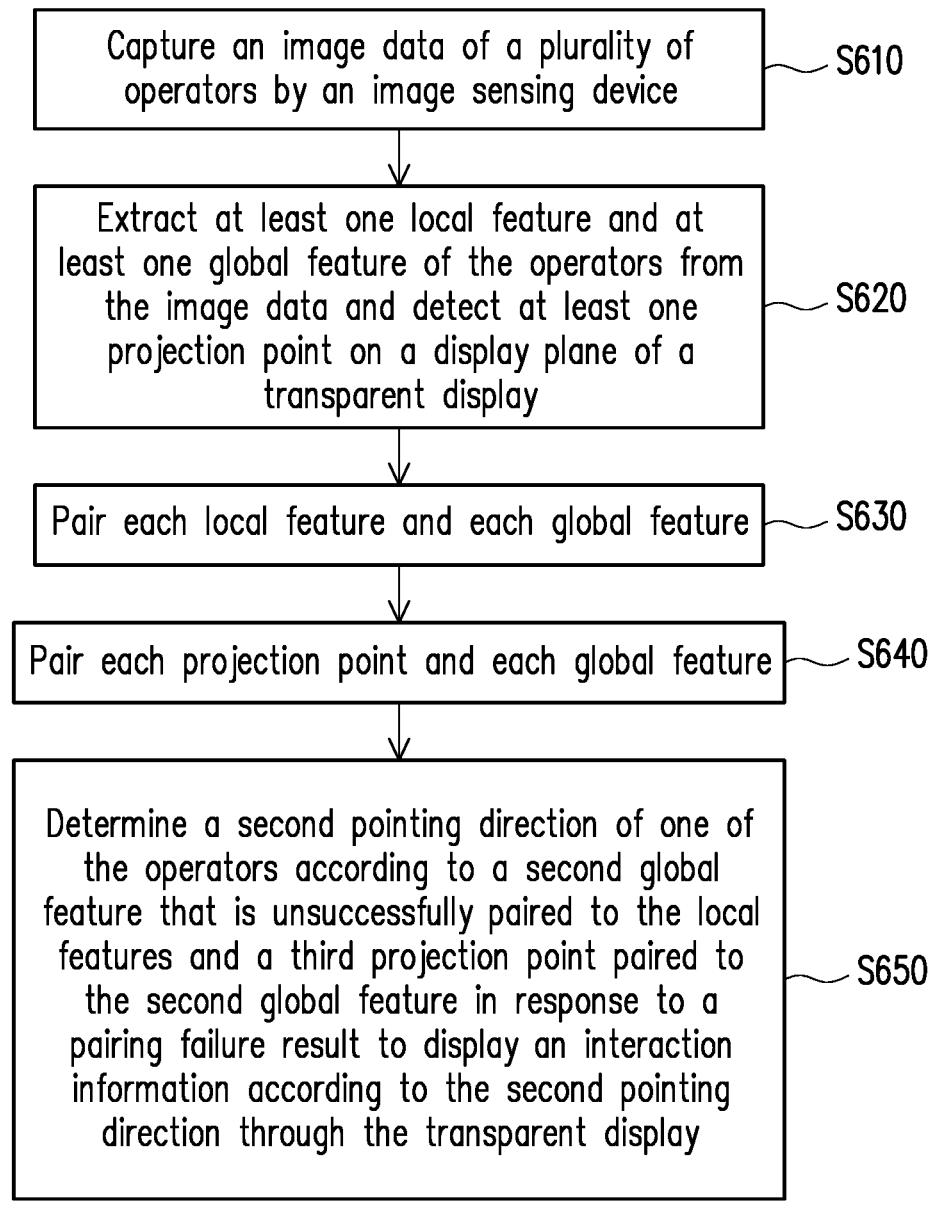
FIG. 6A is a flowchart of an interaction display method according to an embodiment of the disclosure.

FIG. 6A is a flowchart of an interaction display method according to an embodiment of the disclosure. The method process in FIG. 6A may be implemented in combination with the interaction display system 20 shown in FIG. 2. Refer to FIG. 2 and FIG. 6A together. Steps S610 to S640 are similar to steps S310 to S340 of the foregoing embodiment, so the descriptions thereof are omitted herein.

In the present embodiment, the pairing failure result includes: unsuccessful pairing of the second global feature to the local features and successful pairing of the second global feature to the third projection point of the projection points. The local features, the global features, and the projection points that may be paired are referred to as the first local feature, the first global feature, and the first projection point, and a connection pointing direction between the first local feature and the first projection point that are established through simultaneous pairing of the foregoing three is referred to as a first pointing direction. The local features, the global features, and the projection points that may not be in successful one-to-one pairing are respectively referred to as the second local feature, the second global feature, and the second projection point, and a pointing direction that is completed using any unsuccessfully paired feature is referred to as a second pointing direction. Correspondingly, the interaction continuation operation includes: determining the second pointing direction of one of the operators according to the second global feature that is unsuccessfully paired to the local features and a third projection point paired to the second global feature. That is, in response to the pairing failure result, a processing device 230 determines the second pointing direction of one of the operators based on the second global feature that is unsuccessfully paired to the local features and the third projection point that is paired to the second global feature to display interaction information according to the second pointing direction through the transparent display 210 (step S650).

An operator's local features may be blocked by an obstacle or missing beyond the image sensing range, thereby causing unsuccessful one-to-one pairing of the second global feature to the local features. Alternatively, the second global feature of an operator may be paired to two local features due to erroneous pairing, thereby causing unsuccessful one-to-one pairing of the second global feature to the local features. In this case, if the second global feature may be successfully paired to the third projection point, the processing device 230 may use the second local feature replaced by the second global feature to calculate the second pointing direction with the third projection point. For example, although an operator's limb features may not be successfully paired to an eye feature, or an operator's limb features are paired to two eye features, the operator's limb features may be successfully paired to a projection point on a display plane, and the processing device 230 may determine a pointing direction according to a head feature in the limb features and a projection on the display plane. In present embodiment, the second pointing direction is still not completely paired, and a notification information may be given to the operators, for example, suggesting a moving location, notifying a missing feature, notifying an identifiable or an unidentifiable user ID, etc., and the transparent display 210 displays the notification information.

Figure 6B:
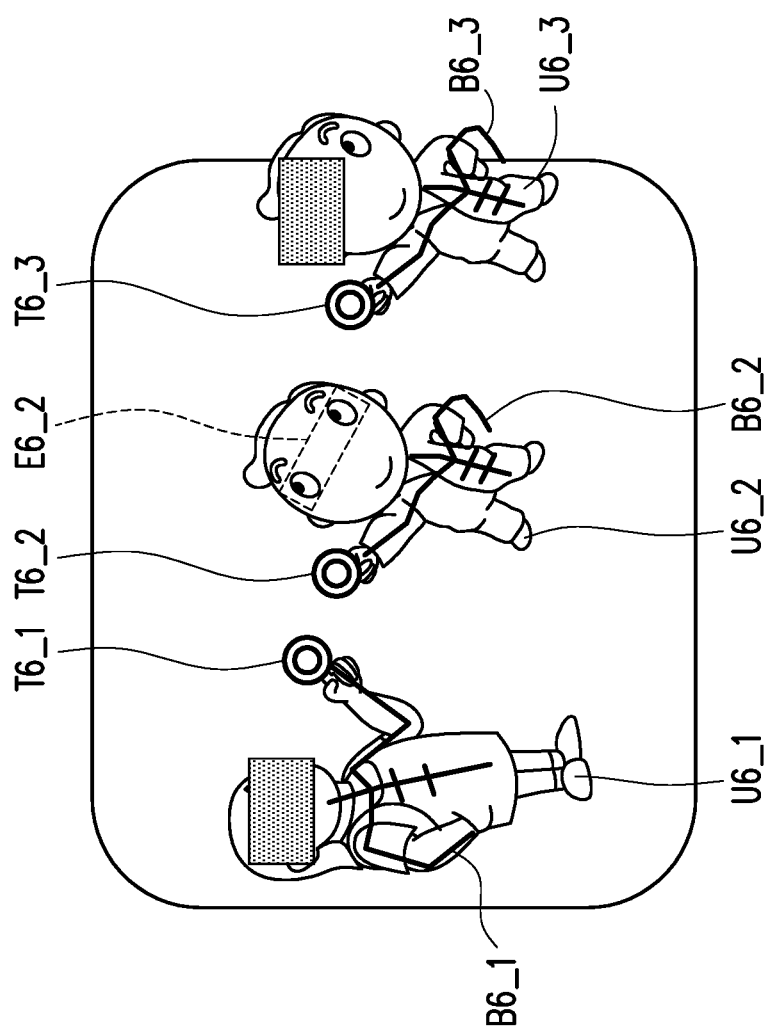
FIG. 6B is a schematic diagram of a scenario of an interaction display method according to an embodiment of the disclosure.

For example, refer to FIG. 6B. FIG. 6B is a schematic diagram of a scenario of an interaction display method according to an embodiment of the disclosure. The processing device 230 may extract one eye feature E6_2 and three limb features B6_1 to B6_3 from an image data and detect three touch points T6_1 to T6_3. In this case, the limb feature B6_2 is successfully paired to the eye feature E6_2, and the limb feature B6_2 is successfully paired to the touch point T6_2. Therefore, the processing device 230 may determine a pointing direction of a user U6_2 according to the eye feature E6_2 and the touch point T6_2 that are successfully paired to the limb feature B6_2. In addition, the limb features B6_1 and B6_3 are unsuccessfully paired to any eye feature, but the limb features B6_1 and B6_3 are successfully paired to the touch points T6_1 and T6_3. Therefore, the processing device 230 determines a pointing direction of a user U6_1 according to a head feature in the limb feature B6_1 and the touch point T6_1 in the interaction continuation operation. The processing device 230 may connect, for example, a spatial coordinate location of the head feature in the limb feature B6_1 and a spatial coordinate location of the touch point T6_1 to generate the pointing direction of the user U6_1. Similarly, the processing device 230 may determine a pointing direction of a user U6_3 in a same manner.

Figure 7A:
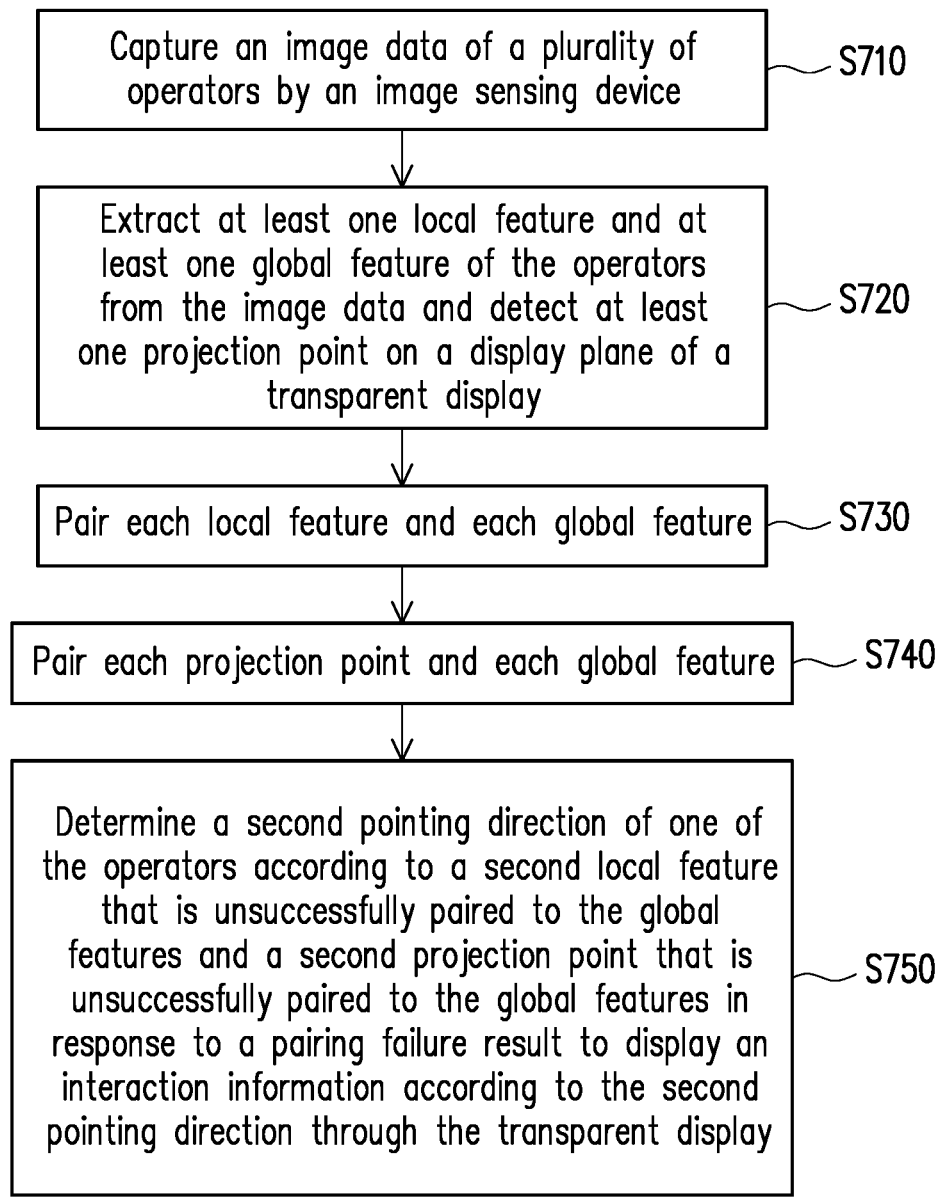
FIG. 7A is a flowchart of an interaction display method according to an embodiment of the disclosure.

FIG. 7A is a flowchart of an interaction display method according to an embodiment of the disclosure. The method process in FIG. 7A may be implemented in combination with the interaction display system 20 shown in FIG. 2. Refer to FIG. 2 and FIG. 7A together. Steps S710 to S740 are similar to steps S310 to S340 of the foregoing embodiment, so the descriptions thereof are omitted herein.

In the present embodiment, the global features are missing, and a pairing failure result includes: unsuccessful pairing of the second local feature to the global features, and unsuccessful pairing of the second projection point to the global features. Correspondingly, the interaction continuation operation includes: determining a second pointing direction of one of the operators according to the second local feature that is unsuccessfully paired to the global features, the second projection point that is unsuccessfully paired to the global features, and a reasonable combination of a feature database. That is, in response to the pairing failure result, the processing device 230 determines the second pointing direction of one of the operators based on the second local feature that is unsuccessfully paired to the global features and the second projection point that is unsuccessfully paired to the global features to display interaction information according to the second pointing direction through the transparent display 210 (step S750).

An operator's global features may be blocked by an obstacle or missing beyond the image sensing range, thereby causing unsuccessful one-to-one pairing of the second local feature to the global features and unsuccessful one-to-one pairing of the second projection point to the global features. In this case, according to a coordinate location of the second local feature and a coordinate location of the second projection point, the processing device 230 determines to use the second local feature and the second projection point to calculate the second pointing direction. For example, when an operator's limb features are missing, the processing device 230 may be established in the feature database according to a distance that the operator may focus and reach out for touch, and it is determined, by setting a distance of 20-65 cm between the eyes (that is, a local feature) and a touch point (that is, a projection point), that the local feature and the touch point within the range (20-65 cm) may be paired to generate the second pointing direction. Therefore, the processing device 230 may calculate the second pointing direction according to the eye feature that is unsuccessfully paired to the limb features and the projection points that is unsuccessfully paired to the limb features, and provide notification information (for example, suggesting a moving location, notifying a missing feature, notifying an identifiable or an unidentifiable user ID, etc.) to the operator, and the transparent display 210 displays the notification information.

Figure 7B:
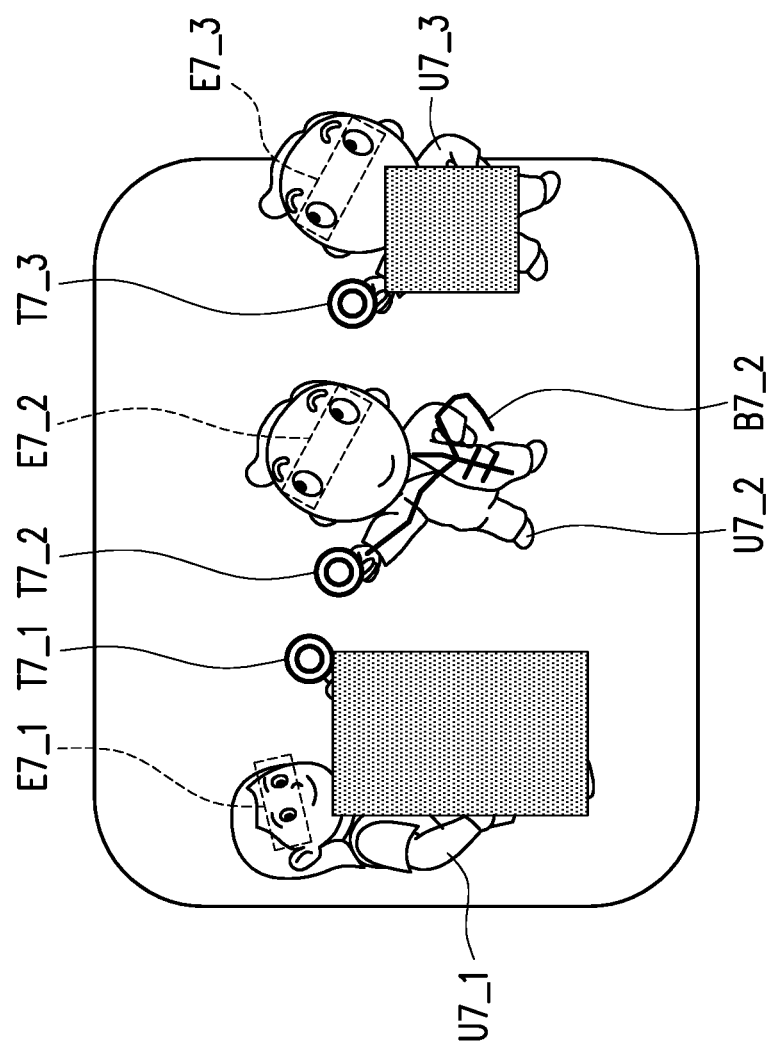
FIG. 7B is a schematic diagram of a scenario of an interaction display method according to an embodiment of the disclosure.

For example, refer to FIG. 7B. FIG. 7B is a schematic diagram of a scenario of an interaction display method according to an embodiment of the disclosure. The processing device 230 may extract three eye features E7_1 to E7_3 and one limb feature B7_2 from an image data and detect three touch points T7_1 to T7_3. In this case, the limb feature B7_2 is successfully paired to the eye feature E7_2, and the limb feature B7_2 is successfully paired to the touch point T7_2. Therefore, the processing device 230 may determine a pointing direction of a user U7_2 according to the eye feature E7_2 and the touch point T7_2 that are successfully paired to the limb feature B7_2. In addition, the eye features E7_1 and E7_3 are unsuccessfully paired to any limb feature, and the touch points T7_1 and T7_3 are unsuccessfully paired to any limb feature. Therefore, in an interaction continuation operation, by comparing a distance between the eye features E7_1 and E7_3 and the touch points T7_1 and T7_3, the processing device 230 may determine a pointing direction of a user U7_1 according to the eye feature E7_1 and the closer touch point T7_1 and determine a pointing direction of a user U7_2 according to the eye feature E7_2 and the closer touch point T7_2.

Figure 8A:
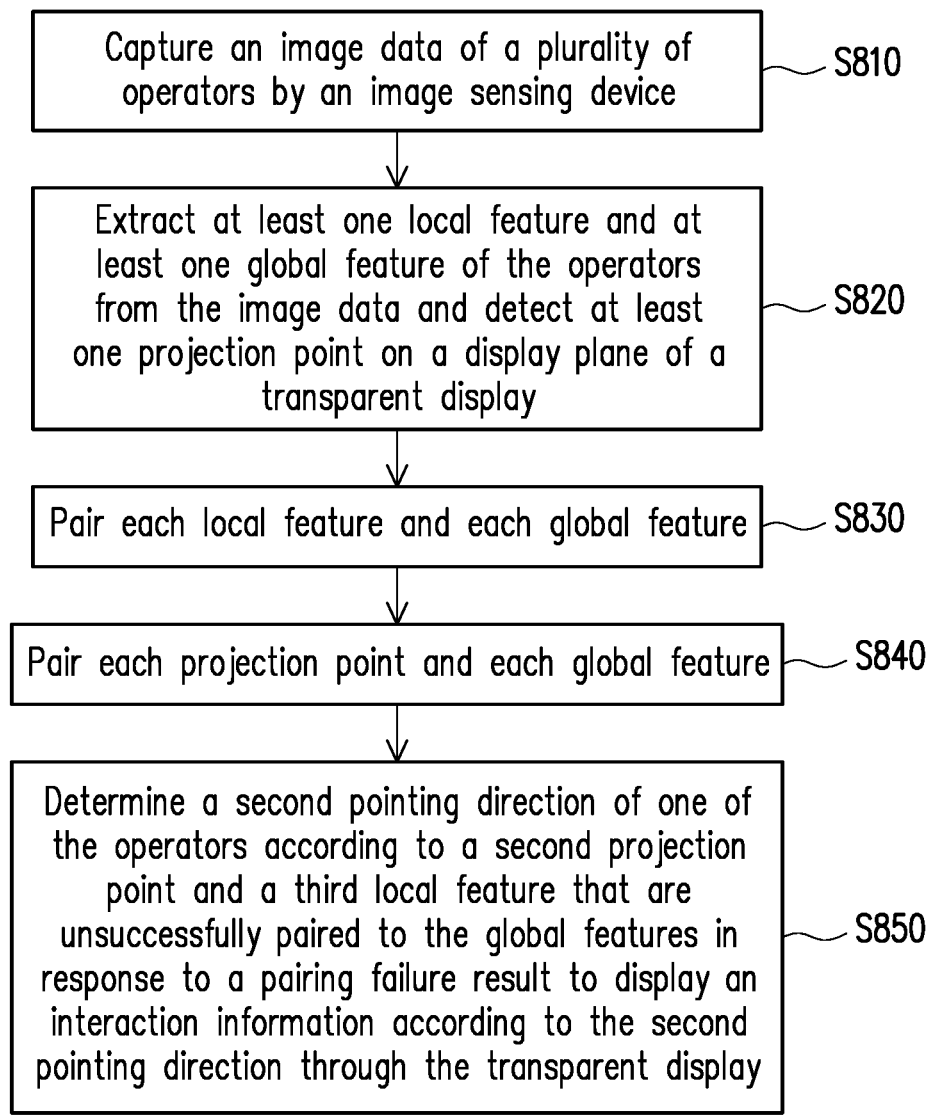
FIG. 8A is a flowchart of an interaction display method according to an embodiment of the disclosure.

FIG. 8A is a flowchart of an interaction display method according to an embodiment of the disclosure. The method process in FIG. 8A may be implemented in combination with the interaction display system 20 shown in FIG. 2. Refer to FIG. 2 and FIG. 8A together. Steps S810 to S840 are similar to steps S310 to S340 of the foregoing embodiment, so the descriptions thereof are omitted herein.

In the present embodiment, projection points may not be in one-to-one pairing, and a pairing failure result includes: pairing of a second projection point to a plurality of sets of global features, and successful pairing of a third global feature of global features to a third local feature of local features. On this basis, the processing device 230 may select a third global feature that meets a specific scoring condition from the global features to assist in determining pointing direction information. As a result, the local features, the global features, and the projection points that may be in successful one-to-one pairing are respectively referred to as the first local feature, the first global feature, and the first projection point, and a connection pointing direction between the first local feature and the first projection point that are established through simultaneous pairing of the foregoing three is referred to as a first pointing direction. Relatively, the local features, the global features, and the projection points that may not be in successful one-to-one pairing are respectively referred to as the second local feature, the second global feature, and the second projection point. Correspondingly, an interaction continuation operation includes: selecting, from the global features, a third global feature that meets a specific scoring condition and determining the second pointing direction of one of operators according to the third local feature and the second projection point that are successfully paired to the third global feature. That is, in response to the pairing failure result, the processing device 230 determines the second pointing direction of one of the operators based on the second projection point and the third local feature that are unsuccessfully paired to the global features to display interaction information according to the second pointing direction through the transparent display 210 (step S850).

In particular, erroneous determining may occur to pairing between pairing of global features and projection points, resulting in unsuccessful pairing of the second projection point to the global feature. Alternatively, if two operators touch a same touch location or touch locations that are close to each other on a display plane, the second projection point may be paired to two global features, resulting in unsuccessful pairing of the second projection point to the global features. In this case, the processing device 230 may first select a third global feature that meets a specific scoring condition from the remaining global features and obtain a third local feature that is successfully paired to the third global feature, and according to a spatial coordinate location of the third local feature and a spatial coordinate location of the second projection point, the processing device 230 may determine to use the third local feature and the second projection point to calculate the second pointing direction. For example, when a projection point may not be in successful one-to-one pairing to a limb feature, the processing device 230 selects one of the projection points corresponding to two mispaired limb faces (that is, two global features of two operators) and a scoring condition for screening in the feature database as a third global feature. Accordingly, the scoring condition is, for example, a closest feature of an eye focus distance and a touchable distance in the feature database. The distance between the face and the transparent display 210 is 20-65 cm, and a closer distance leads to a high score. In addition, an angle deviation between the face orientation and the orientation of the display plane is less than 0 to 15 degrees, and a smaller angle leads to a high score. The one with a higher score in the two mispaired limb faces is selected as the third global feature. Therefore, the processing device 230 may generate the second pointing direction according to the selected third global feature and the second projection point. For example, the processing device 230 may calculate the second pointing direction according to the projection points in unsuccessful one-to-one pairing to the limb features and the eye feature paired to the screened third global feature. In the present embodiment, the second pointing direction is still not completely paired, notification information may be given to the operators, for example, suggesting a moving location, notifying a missing feature, notifying an identifiable or an unidentifiable user ID, etc., and the transparent display 210 displays the notification information.

In an embodiment, the third global feature may be filtered out using knowledge in a known feature database. For example, based on a length of a 16 cm foot plate, a head may be predicted to be at a height of 90-110 cm, and the head should be located at 20-60 cm around the projection points. On this basis, the second pointing direction may be provided by utilizing the head feature and the second projection point in the third global feature of the operators.

Figure 8B:
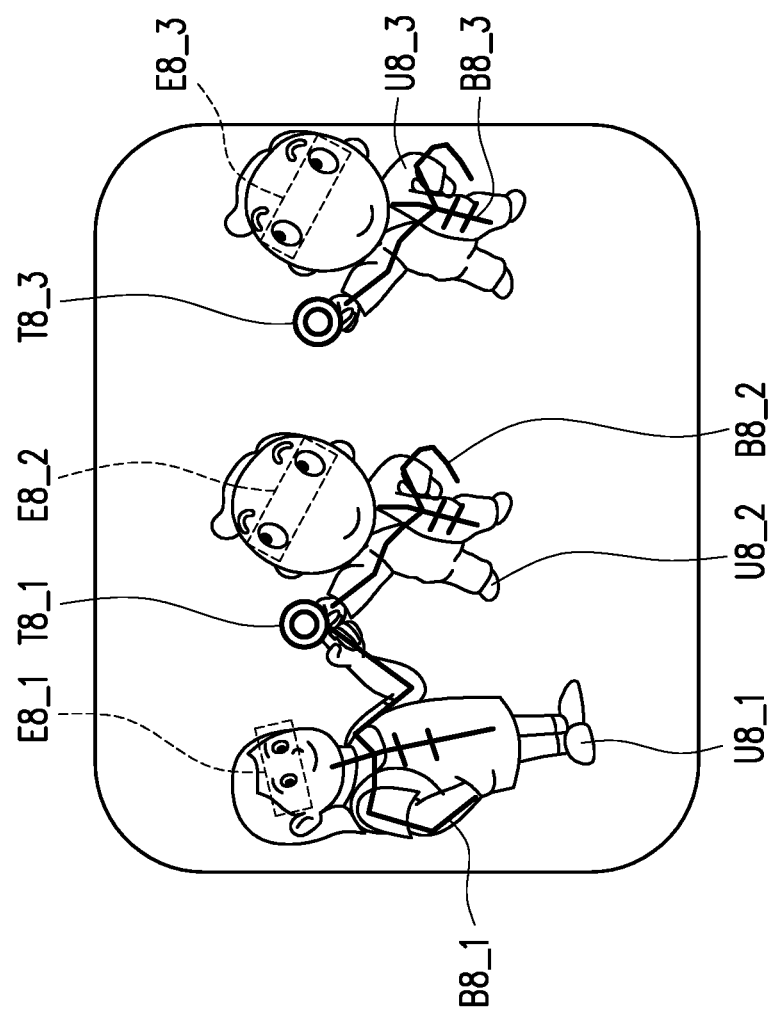
FIG. 8B is a schematic diagram of a scenario of an interaction display method according to an embodiment of the disclosure.

For example, refer to FIG. 8B. FIG. 8B is a schematic diagram of a scenario of an interaction display method according to an embodiment of the disclosure. The processing device 230 may extract three eye features E8_1-E8_3 and three limb features B8_1-B8_3 from an image data and detect two touch points T8_1 and T8_3. In this case, the limb feature B8_3 is successfully paired to the eye feature E8_3, and the limb feature B8_3 is successfully paired to the touch point T8_3. Therefore, the processing device 230 may determine a pointing direction of a user U8_3 according to the eye feature E8_3 and the touch point T8_3 that are successfully paired to the limb feature B8_3. In addition, the touch point T8_1 is in unsuccessful one-to-one pairing to any limb feature. Therefore, in an interaction continuation operation, by comparing a distance between the eye features E8_1 and E8_2 and the touch point T8_1, the processing device 230 may determine a second pointing direction shared with the users U8_1 and U8_2 according to one of the eye features E8_1 and E8_2 that is closer to the touch point T8_1 and the touch control point T8_1, thereby avoiding display content confusion.

Figure 9A:
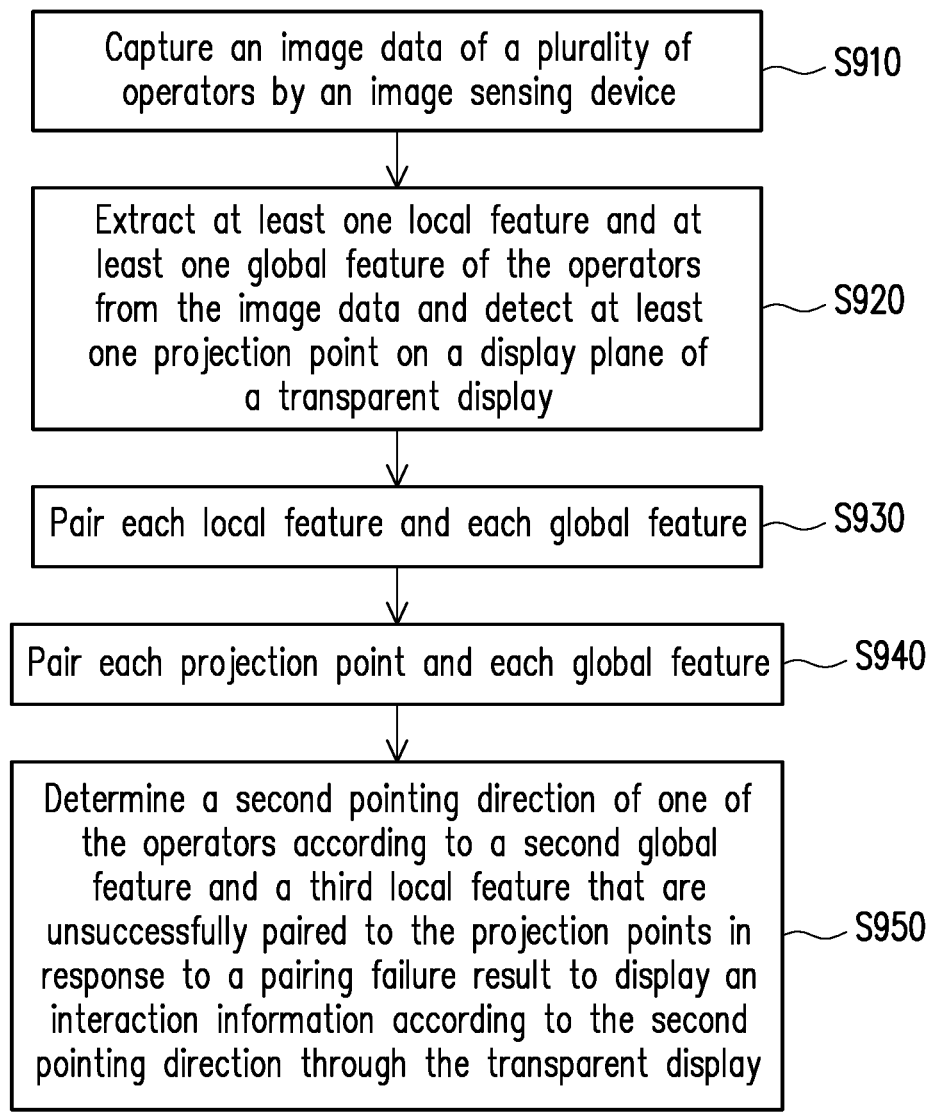
FIG. 9A is a flowchart of an interaction display method according to an embodiment of the disclosure.

FIG. 9A is a flowchart of an interaction display method according to an embodiment of the disclosure. The method process in FIG. 9A may be implemented in combination with the interaction display system 20 shown in FIG. 2. Refer to FIG. 2 and FIG. 9A together. Steps S910 to S940 are similar to steps S310 to S340 of the foregoing embodiment, so the descriptions thereof are omitted herein.

In the present embodiment, projection points are missing, and a pairing failure result includes: unsuccessful pairing of a second global feature to the projection points, and successful pairing of the second global feature of global features to a third local feature of local features. Correspondingly, an interaction continuation operation includes: determining a second pointing direction of one of the operators according to the second global feature and the third local feature that are unsuccessfully paired to the projection points. That is, in response to the pairing failure result, the processing device 230 determines the second pointing direction of one of the operators based on the second global feature and the third local feature that are unsuccessfully paired to the projection points to display interaction information according to the second pointing direction through the transparent display 210 (step S950).

In particular, the projection points may be missing due to an error in the detection process, resulting in unsuccessful pairing of the second global feature to any projection point. In this case, if the second global feature may be successfully paired to the third local feature, the processing device 230 may calculate the second pointing direction according to the second global feature and the third local feature. For example, an operator's limb features may not be successfully paired to the projection points on a display plane, but the processing device 230 may also determine a second pointing direction according to a hand feature in the limb features and the eye features. In the present embodiment, the second pointing direction is still not completely paired, notification information may be given to the operators, for example, suggesting a moving location, notifying a missing feature, notifying an identifiable or an unidentifiable user ID, etc., and the transparent display 210 displays the notification information.

Figure 9B:
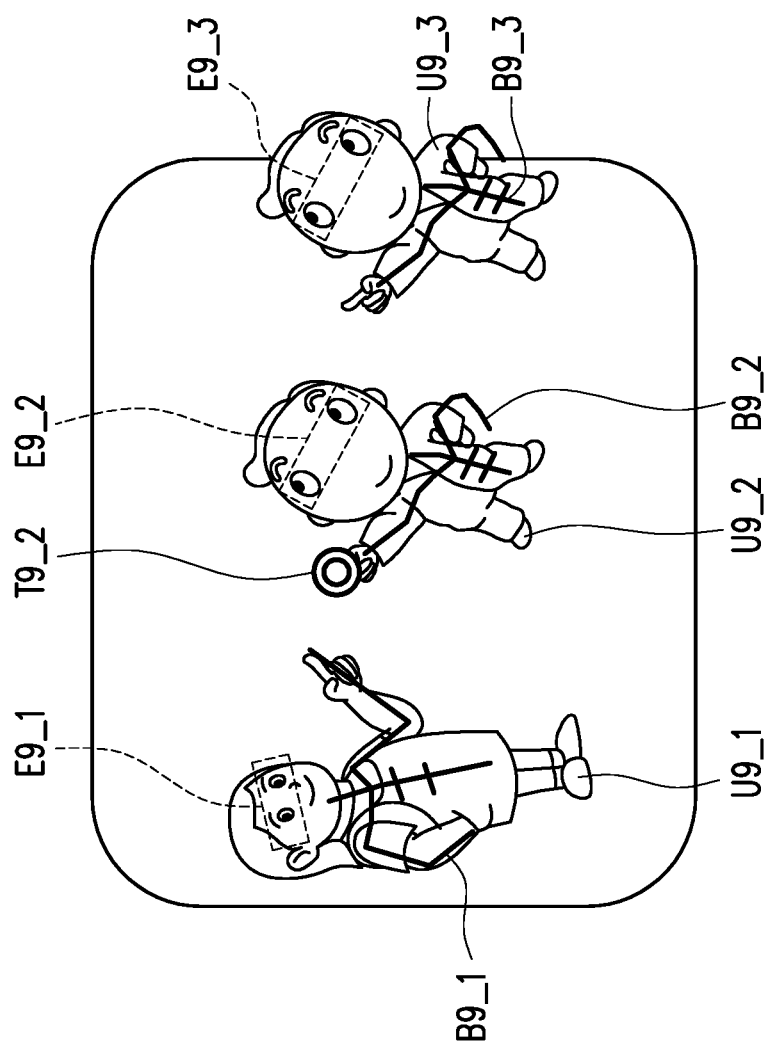
FIG. 9B is a schematic diagram of a scenario of an interaction display method according to an embodiment of the disclosure.

For example, refer to FIG. 9B. FIG. 9B is a schematic diagram of a scenario of an interaction display method according to an embodiment of the disclosure. The processing device 230 may extract three eye features E9_1-E9_3 and three limb features B9_1-B9_3 from an image data and detect one touch point T9_2. It may be learned from the foregoing description that, the processing device 230 may determine a pointing direction of a user U9_2 according to the eye feature E9_2, the limb feature B9_2, and the touch point T9_2. In addition, because the projection points are missing, the limb features B9_1 and B9_3 are unsuccessfully paired to any projection point, but the limb features B9_1 and B9_3 are successfully paired to the eye features E9_1 and E9_3. Therefore, in an interaction continuation operation, the processing device 230 determines a pointing direction of a user U9_1 according to a distance between hand features in the limb features B9_1 and B9_3 and the eye features E9_1 and E9_3 and the hand features in the limb feature B9_1 and the eye feature E9_1. For example, the processing device 230 may connect a spatial coordinate location of the hand features in the limb feature B9_1 and a spatial coordinate location of the eye feature E9_1 to generate the pointing direction of the user U9_1. Similarly, the processing device 230 may determine a pointing direction of a user U9_3 in a same manner.

Figure 10A:
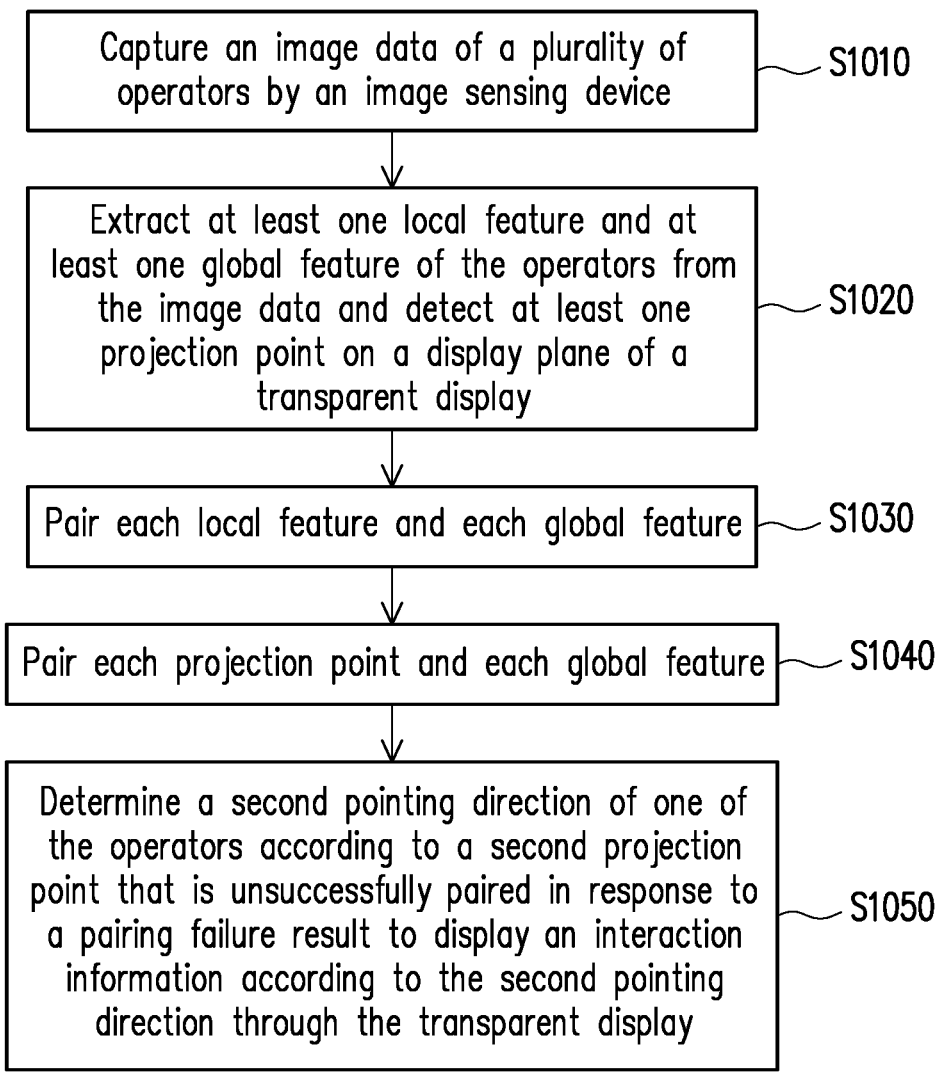
FIG. 10A is a flowchart of an interaction display method according to an embodiment of the disclosure.

FIG. 10A is a flowchart of an interaction display method according to an embodiment of the disclosure. The method process in FIG. 10A may be implemented in combination with the interaction display system 20 shown in FIG. 2. Refer to FIG. 2 and FIG. 10A together. Steps S1010 to S1040 are similar to steps S310 to S340 of the foregoing embodiment, so the descriptions thereof are omitted herein.

In the present embodiment, global features and local features are missing, and a pairing failure result includes: unsuccessful pairing of a second projection point to the global features and absence of associable local features, or absence of an alternative global feature that may collaborate with the second projection point to generate a second pointing direction. Correspondingly, an interaction continuation operation includes: determining a second pointing direction according to the unsuccessfully paired second projection point and a target object located on one side of a transparent display. That is, in response to the pairing failure result, the processing device 230 determines the second pointing direction of one of the operators based on the unsuccessfully paired second projection point to display interaction information according to the second pointing direction through the transparent display 210 (step S1050).

An operator's global features and local features may be blocked by obstacles at the same time or missing beyond the image sensing range, thereby causing unsuccessful one-to-one pairing of the second projection point to the global features. In addition, because an operator's local features and global features are missing at the same time, the local features and the detected projection points may not be used to generate a pointing direction. For example, there is a touch point, but a limb and eyes are not detected. In this case, the processing device 230 may determine, according to a spatial coordinate location of a target object behind the transparent display 210 and a spatial coordinate location of the second projection point, to use the second projection point to calculate the second pointing direction. In the present embodiment, the second pointing direction is still not completely paired, notification information may be given to the operators, for example, suggesting a moving location, notifying a missing feature, notifying an identifiable or an unidentifiable identification code (User ID), etc., and the transparent display 210 displays the notification information.

Figure 10B:
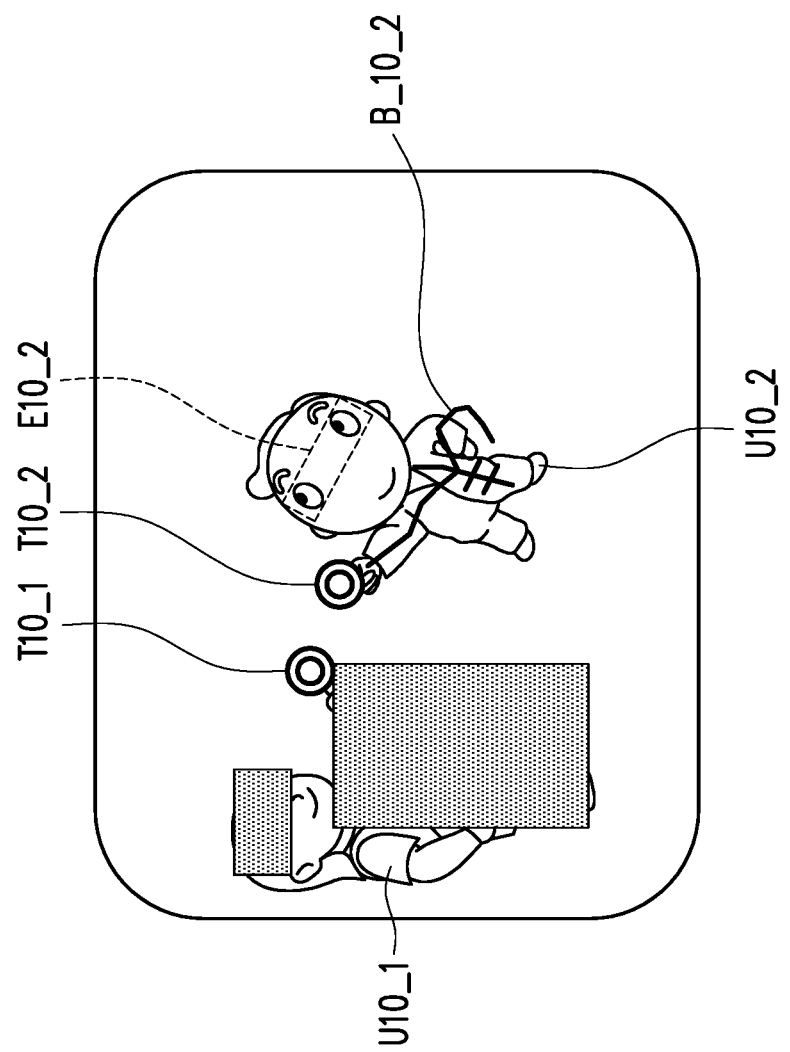
FIG. 10B is a schematic diagram of a scenario of an interaction display method according to an embodiment of the disclosure.

For example, refer to FIG. 10B. FIG. 10B is a schematic diagram of a scenario of an interaction display method according to an embodiment of the disclosure. The processing device 230 may extract an eye feature E10_2 and a limb feature B10_2 from an image data and detect touch points T10_1 to T10_2. It may be learned from the foregoing description that, the processing device 230 may determine a pointing direction of a user U10_2 according to the eye feature E10_2, the limb feature B10_2, and the touch point T10_2. In addition, because the eye features and limb features are missing, the projection point T10_1 is unsuccessfully paired to any eye feature and limb feature. Therefore, in an interaction continuation operation, the processing device 230 determines a pointing direction according to a spatial coordinate location of a target object behind the transparent display 210 and a spatial coordinate location of the projection point T10_1. For example, the processing device 230 may connect the projection point T10_1 to a coordinate location of a target object closest to the projection point T10_1 behind the transparent display 210 to generate a pointing direction of a user U10_1.

In an embodiment, it is assumed that a global feature is a limb feature. The processing device 230 may further determine whether a hand feature in the limb features meets an interaction control condition. The interaction control condition includes that the limb features includes a hand feature that conforms to a pointing control gesture, and the hand feature is sufficiently close to a display plane. If the limb features do not include a hand feature that meets the interaction control condition, the processing device 230 may exclude the limb features. In this way, erroneous determination as a result of incorporating limb features of passersby without interaction intention into a pairing process may be avoided.

Figure 11:
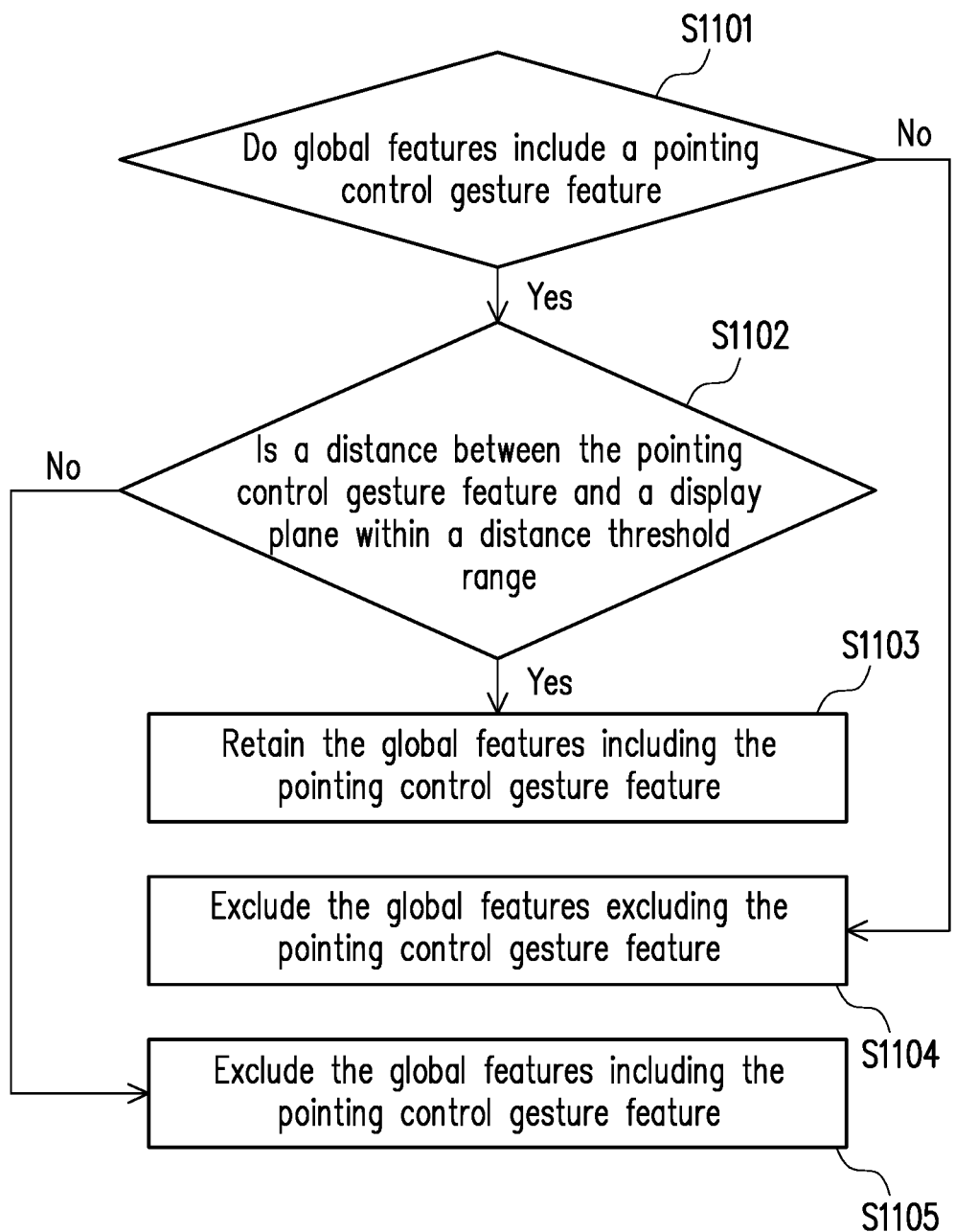
FIG. 11 is a flowchart of an interaction display method according to an embodiment of the disclosure.

FIG. 11 is a flowchart of an interaction display method according to an embodiment of the disclosure. The method process in FIG. 11 may be implemented in combination with the interaction display system 20 shown in FIG. 2. Refer to FIG. 2 and FIG. 11 together.

In an embodiment, a global feature is a limb feature. The processing device 230 may perform steps S1101-S1104 shown in FIG. 11 before pairing an eye feature to the limb feature and pairing a projection point to the limb feature. The processing device 230 determines, according to a plurality of joint positions in the global features, whether the global features include a pointing control gesture feature (step S1101). The processing device 230 may establish, according to a feature database, a projection distance or a three-dimensional space location from a shoulder joint to a wrist joint of a touch hand, to determine whether the limb feature includes a hand feature conforming to the pointing control posture. For example, in a gesture of dropping the hand, a projection length from the shoulder joint to the wrist joint on the screen may be 50-70 cm for adults; when a hand is raised for touch, the projection length becomes shorter, for example, 0-40 cm, so that it may be determined whether the gesture is a touch gesture, which may filter out a non-operator that is close to the screen when dropping the hand that is only a passer-by. Alternatively, the processing device

230 determines, according to a finger joint, whether the limb feature includes a hand feature in conformity with the pointing control gesture.

Next, if the global features include the pointing control gesture feature (determined as yes in step S1101), the processing device 230 determines whether a distance between the hand feature in conformity with the pointing control gesture and a display plane is within a distance range (step S1102). For example, a distance between a touch finger and a screen is close to 0. The processing device 230 may further determine, according to the distance between the hand feature and the display plane, whether the operators have an interaction intention. The distance threshold range may be designed according to actual needs, which is not limited in the disclosure. If the distance between the pointing control gesture feature and the display plane is within the distance threshold range (determined as yes in step S1102), the processing device 230 retains the limb feature including the hand feature (step S1103), so that the retained limb feature is available for pairing.

According to another aspect, if the global features do not include the pointing control gesture feature (determined as no in step S1101), the processing device 230 excludes the global features excluding the pointing control gesture feature (step S1104). If the distance between the pointing control gesture feature and the display plane is not within the distance threshold range (determined as no in step S1102), the processing device 230 excludes the global features including the pointing control gesture feature (step S1105). In this way, erroneous determination as a result of incorporating global features of passers-by without interaction intention into a pairing process may be avoided.

In an embodiment of the disclosure, when a plurality of operators interact with the transparent display in the interaction display system at the same time, global features may be used to assist in correctly pairing the local features and the projection points on the display plane to more accurately determine the pointing directions of these operators. Therefore, the interaction display system in the disclosure may achieve a high-accuracy interaction experience and make the information displayed on the transparent display easy to observe.

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An interaction display method adapted for an interaction display system comprising a transparent display, at least one image sensing device, and a processing device, comprising:
    capturing an image data of a plurality of operators by the image sensing device; and
    performing the following steps by the processing device:
        extracting local features of the plurality of operators and global features of the plurality of operators from the image data and detecting projection points on a display plane of the transparent display, wherein the projection points are generated in response to interactive behaviors of the plurality of operators;
        pairing each of the local features and each of the global features;
        pairing each of the projection points and each of the global features; and
        determining a pointing direction of an operator from the plurality of operators according to a pairing result between each of the local features and each of the global features and according to a pairing result between each of the projection points and each of the global features,
    wherein the step of determining the pointing direction of an operator from the plurality of operators according to the pairing result between each of the local features and each of the global features and according to the pairing result between each of the projection points and each of the global features comprises:
        determining a first pointing direction of a first operator according to a first local feature of the first operator and a first projection point of the first operator in response to that the first local feature of the first operator is in one-to-one pairing to a first global feature of the first operator and that the first projection point of the first operator is in one-to-one pairing to the first global feature of the first operator; and
    displaying an interaction information according to the first pointing direction through the transparent display,
    wherein the interaction display method further comprising the following steps performed by the processing device:
        in response to a pairing failure result, performing an interaction continuation operation to generate a second pointing direction of a second operator; and
        based on the second pointing direction of the second operator, using the transparent display to display an interaction information or provide a notification information to the plurality of operators,
    wherein the pairing failure result comprises:
        an unsuccessful pairing between a second local feature of the second operator and a second projection point of the second operator; or
        an unsuccessful pairing between the second local feature of the second operator and a second global feature of the second operator; or
        an unsuccessful pairing between the second projection point of the second operator and the second global feature of the second operator,
    wherein the interaction continuation operation comprises:
        using an unsuccessfully-paired feature obtained from the pairing failure result to query a feature association score in a feature database; and
        selecting a feature combination based on the feature association score to determine the second pointing direction of the second operator.

2. The interaction display method according to claim 1, wherein providing the notification information comprises suggesting a moving location, notifying a missing feature, or notifying an identification result of a user identification code.

3. The interaction display method according to claim 1, wherein the pairing failure result further comprises: an unsuccessful pairing of the second global feature of the second operator to the second local feature of the second operator and a successful pairing of the second global feature of the second operator to the second projection point of the second operator,
    wherein the interaction continuation operation comprises:

determining the second pointing direction of the second operator based on the second global feature of the second operator that is unsuccessfully paired to the second local feature of the second operator and based on the second projection point of the second operator that is successfully paired to the second global feature of the second operator.

4. The interaction display method according to claim 1, wherein the pairing failure result further comprises: an unsuccessful pairing of the second local feature of the second operator to the second global feature of the second operator and an unsuccessful pairing of the second projection point of the second operator to the second global feature of the second operator, wherein the interaction continuation operation comprises:
determining the second pointing direction of the second operator based on the second local feature of the second operator that is unsuccessfully paired to the second global feature of the second operator and based on the second projection point of the second operator that is unsuccessfully paired to the second global feature of the second operator.

5. The interaction display method according to claim 1, wherein the pairing failure result further comprises: an unsuccessful one-to-one pairing of the second projection point of the second operator to the second global feature of the second operator and a successful pairing of a third global feature of a third operator to a third local feature of the third operator, wherein the interaction continuation operation comprises:
selecting the third global feature that meets a specific scoring condition from the plurality of the operators; and
determining a third pointing direction of the third based on the third local feature of the third operator that is successfully paired to the third global feature of the third operator and based on the second projection point of the second operator.

6. The interaction display method according to claim 1, wherein the pairing failure result further comprises: an unsuccessful pairing of the second global feature of the second operator to any projection point on the display plane and a successful pairing of the second global feature of the second operator to the the second local feature of second operator, wherein the interaction continuation operation comprises:
determining the second pointing direction of the second operator based on the second global feature of the second operator that is unsuccessfully paired to any projection point on the display plane and based on the second local feature of the second operator.

7. The interaction display method according to claim 1, wherein the pairing failure result further comprises: an unsuccessful pairing of the second projection point of the second operator to the second global feature of the second operator and an absence of an associable local feature of the second operator, wherein the interaction continuation operation comprises:
determining the second pointing direction of the second operator according to the second projection point of the second operator that is unsuccessfully paired and according to a target object located on one side of the transparent display.

8. The interaction display method according to claim , wherein before the global features are paired, the method further comprises performing the following steps by the processing device:

determining whether the global features comprise a pointing control gesture feature according to a plurality of joint positions in the global features;
determining whether a distance between the pointing control gesture feature and the display plane is within a distance threshold range if the global features comprise the pointing control gesture feature; and
retaining the global features comprising the pointing control gesture feature if the distance between the pointing control gesture feature and the display plane is within the distance threshold range.

9. The interaction display method according to claim 1, wherein the step of pairing each of the local features and each of the global features comprises:
determining whether a distance between a spatial coordinate location of each of the local features and a spatial coordinate location of each of the global features is within a threshold range to pair each of the local features and each of the global features.

10. The interaction display method according to claim 1, wherein the step of pairing each of the projection points and each of the global features comprises:
determining whether a distance between a spatial coordinate location of each of the projection points and a spatial coordinate location of each of the global features is within another threshold range or determining an angle deviation between a face orientation and an orientation of the display plane to pair each of the projection points and each of the global features.

11. An interaction display system, comprising:
a transparent display;
an image sensing device capturing an image data of a plurality of operators; and
a processing device coupled to the transparent display and the image sensing device,
wherein the processing device is configured to perform the following steps:
extracting local features of the plurality of operators and global features of the plurality of operators from the image data and detecting projection points on a display plane of the transparent display, wherein the projection points are generated in response to interactive behaviors of the plurality of operators;
pairing each of the local features and each of the global features;
pairing each of the projection points and each of the global features; and
determining a pointing direction of an operator from the plurality of operators according to a pairing result between each of the local features and each of the global features and according to a pairing result between each of the projection points and each of the global features,
wherein the processing device is further configured to perform the following steps:
determining a first pointing direction of a first operator according to a first local feature of the first operator and a first projection point of the first operator in response to that the first local feature of the first operator is in one-to-one pairing to the first global feature of the first operator and that the first projection point of the first operator is in one-to-one pairing to the first global feature of the first operator; and
displaying an interaction information according to the first pointing direction through the transparent display, wherein the processing device is further configured to perform the following steps:
  in response to a pairing failure result, performing an interaction continuation operation to generate a second pointing direction of a second operator; and
  based on the second pointing direction of the second operator, using the transparent display to display an interaction information or provide a notification information to the plurality of operators,
wherein the pairing failure result comprises:
  an unsuccessful pairing between a second local feature of the second operator and a second projection point of the second operator; or
  an unsuccessful pairing between the second local feature of he second operator and a second global feature of the second operator; or
  an unsuccessful pairing between the second projection point of the second operator and the second global feature of the second operator,
wherein the interaction continuation operation comprises:
  using an unsuccessfully-paired feature obtained from the pairing failure result to query a feature association score in a feature database; and
  selecting a feature combination based on the feature association score to determine the second pointing direction of the second operator.

12. The interaction display system according to claim 11, wherein providing the notification information comprises suggesting a moving location, notifying a missing feature, or notifying an identification result of a user identification code.

13. The interaction display system according to claim 11, wherein the pairing failure result further comprises: an unsuccessful pairing of the second global feature of the second operator to the second local feature of the second operator and a successful pairing of the second global feature of the second operator to the second projection point of the second operator,
  wherein the interaction continuation operation comprises:
    determining the second pointing direction of the second operator based on the second global feature of the second operator that is unsuccessfully paired to the second local feature of the second operator and based on the second projection point of the second operator that is successfully paired to the second global feature of the second operator.

14. The interaction display system according to claim 11, wherein the pairing failure result further comprises: an unsuccessful pairing of the second local feature of the second operator to the second global feature of the second operator and an unsuccessful pairing of the second projection point of the second operator to the second global feature of the second operator,
  wherein the interaction continuation operation comprises:
    determining the second pointing direction of the second operator based on the second local feature of the second operator that is unsuccessfully paired to the second global feature of the second operator and based on the second projection point of the second operator that is unsuccessfully paired to the second global feature of the second operator.

15. The interaction display system according to claim 11, wherein the pairing failure result further comprises: an unsuccessful one-to-one pairing of the second projection point of the second operator to the second global feature of the second operator and a successful pairing of a third global feature of a third operator to a third local feature of the third operator,
  wherein the interaction continuation operation comprises:
    selecting the third global feature that meets a specific scoring condition from e plurality of the operators; and
    determining a third pointing direction of the third operator based on the third local feature of the third operator that is successfully paired to the third global feature of the third operator and based on the second projection point of the second operator.

16. The interaction display system according to claim 11, wherein the pairing failure result further comprises: an unsuccessful pairing of the second global feature of the second operator to any projection point on the display plane and a successful pairing of the second global feature of the second operator to the second local feature of the second operator,
  wherein the interaction continuation operation comprises:
    determining the second pointing direction of the second operator based on the second global feature of the second operator that is unsuccessfully paired to any projection point on the display plane and based on the third second local feature of the second operator.

17. The interaction display system according to claim 11, wherein the pairing failure result further comprises: an unsuccessful pairing of the second projection point of the second operator to the second global feature of the second operator and an absence of an associable local feature of the second operator,
  wherein the interaction continuation operation comprises:
    determining the second pointing direction of the second operator according to the second projection point of the second operator that is unsuccessfully paired and according to a target object located on one side of the transparent display.

18. The interaction display system according to claim , wherein before the global features are paired, the processing device is fiirther configured to perform the following steps:
  determining whether the global features comprise a pointing control gesture feature according to a plurality of joint positions in the global features;
  determining whether a distance between the pointing control gesture feature and the display plane is within a distance threshold range if the global features comprise the pointing control gesture feature; and
  retaining the global features comprising the pointing control gesture feature if the distance between the pointing control gesture feature and the display plane is within the distance threshold range.

* * * * *